United States Patent
Wang et al.

(10) Patent No.: US 12,382,369 B2
(45) Date of Patent: *Aug. 5, 2025

(54) BROADCASTING OF A NON-TERRESTRIAL NETWORK SYSTEM INFORMATION BLOCK

(71) Applicant: QUALCOMM Incorporated, San Diego, CA (US)

(72) Inventors: Xiao Feng Wang, San Diego, CA (US); Liangping Ma, San Diego, CA (US); Bharat Shrestha, San Diego, CA (US); Umesh Phuyal, San Diego, CA (US); Alberto Rico Alvarino, San Diego, CA (US); Ayan Sengupta, San Diego, CA (US); Peter Gaal, San Diego, CA (US); Wanshi Chen, San Diego, CA (US); Juan Montojo, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/169,428

(22) Filed: Feb. 15, 2023

(65) Prior Publication Data

US 2023/0276349 A1    Aug. 31, 2023

Related U.S. Application Data

(63) Continuation of application No. 17/661,996, filed on May 4, 2022, now Pat. No. 11,589,292.

(Continued)

(51) Int. Cl.
*H04B 7/185* (2006.01)
*H04W 48/10* (2009.01)

(52) U.S. Cl.
CPC ........ *H04W 48/10* (2013.01); *H04B 7/18513* (2013.01)

(58) Field of Classification Search
CPC ........................... G01S 19/05; H04B 7/18513
See application file for complete search history.

(56) References Cited

U.S. PATENT DOCUMENTS 8,243,712 B2  8/2012  Krasner
9,119,167 B2  8/2015  Edge et al.
(Continued)

FOREIGN PATENT DOCUMENTS

CN  112787712 A  5/2021
CN  113973365 A  1/2022
(Continued)

OTHER PUBLICATIONS

Asia Pacific Telecom., et al., "Time and Frequency Synchronization to NB-IoT in NTN", R1-2102736, 3GPP TSG RAN WG1#104bis-e, e-Meeting, Apr. 12-Apr. 20, 2021, 5 Pages.
(Continued)

*Primary Examiner* — Khalid W Shaheed
(74) *Attorney, Agent, or Firm* — Harrity & Harrity, LLP

(57) ABSTRACT

Various aspects of the present disclosure generally relate to wireless communication. In some aspects, a user equipment (UE) may receive, from an entity of a non-terrestrial network (NTN), a system information block (SIB) that indicates information relating to one or more NTN SIBs that are to include at least one of ephemeris information or feeder link timing advance information. The UE may receive, from the entity of the NTN, the one or more NTN SIBs based at least in part on the information. Numerous other aspects are described.

23 Claims, 10 Drawing Sheets

Related U.S. Application Data

(60) Provisional application No. 63/203,961, filed on Aug. 5, 2021.

(56) References Cited

U.S. PATENT DOCUMENTS

| | | | |
|---|---|---|---|
| 11,589,292 B1 | 2/2023 | Wang | |
| 2021/0352606 A1* | 11/2021 | Hosseinian | H04W 56/005 |
| 2022/0029733 A1 | 1/2022 | Ye et al. | |
| 2022/0124660 A1* | 4/2022 | Cheng | H04W 80/02 |
| 2022/0232504 A1 | 7/2022 | Cozzo et al. | |

FOREIGN PATENT DOCUMENTS

| | | |
|---|---|---|
| CN | 114270962 A | 4/2022 |
| CN | 114390715 A | 4/2022 |
| TW | 202203690 A | 1/2022 |
| WO | 2020204421 A1 | 10/2020 |
| WO | 2021017690 A1 | 2/2021 |
| WO | 2021066696 A1 | 4/2021 |
| WO | 2021180154 A1 | 9/2021 |
| WO | 2022084946 A1 | 4/2022 |
| WO | 2022199257 A1 | 9/2022 |

OTHER PUBLICATIONS

Asia Pacific Telecom., et al., "UL Time and Frequency Synchronization in NTN", R1-2102733, 3GPP TSG RAN WG1#104bis-e, e-Meeting, Apr. 12-Apr. 20, 2021, 9 Pages.

Moderator (Mediatek): "Summary #4 of AI 8.15.2 Enhancements to Time and Frequency Synchronization", R1-2103964, Apr. 12-Apr. 20, 2021 , 78 Pages.

International Search Report and Written Opinion—PCT/US2022/072980—ISA/EPO—dated Oct. 11, 2022.

Lin X., et al., "5G from Space: An Overview of 3GPP Non-Terrestrial Networks", Mar. 2021 (Year: 2021), pp. 1-8.

ERICSSON: "Stage-3 Running Rrc Cr for NTN Rel-17", 3GPP TSG-RAN WG2 Meeting #114-e, R2-2106541, Electronic Meeting, May 19, 2021-May 28, 2021, Jun. 7, 2021, pp. 1-940.

Qualcomm Incorporated: "Hard and Soft TAC Update Timing", 3GPP TSG-RAN WG2 Meeting #114-e, R2-2105432, E-Meeting, May 19, 2021-May 27, 2021, May 11, 2021, 4 pages.

* cited by examiner

BROADCASTING OF A NON-TERRESTRIAL NETWORK SYSTEM INFORMATION BLOCK

CROSS-REFERENCE TO RELATED APPLICATION

This Patent Application is a continuation of U.S. Non-Provisional application Ser. No. 17/661,996, filed on May 4, 2022, entitled "BROADCASTING OF A NON-TERRESTRIAL NETWORK SYSTEM INFORMATION BLOCK", which claims priority to U.S. Provisional Patent Application No. 63/203,961, filed on Aug. 5, 2021, entitled "BROADCASTING OF A NON-TERRESTRIAL NETWORK SYSTEM INFORMATION BLOCK," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for broadcasting of a non-terrestrial network (NTN) system information block (SIB).

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication at a user equipment (UE). The method may include receiving, from an entity of a non-terrestrial network (NTN), a system information block (SIB) that indicates information relating to one or more NTN SIBs that are to include at least one of ephemeris information or feeder link timing advance information. The method may include receiving, from the entity of the NTN, the one or more NTN SIBs based at least in part on the information.

Some aspects described herein relate to a method of wireless communication at an entity of an NTN. The method may include transmitting, to a UE, a SIB that indicates information relating to one or more NTN SIBs that are to include at least one of ephemeris information or feeder link timing advance information. The method may include transmitting, to the UE, the one or more NTN SIBs based at least in part on the information.

Some aspects described herein relate to an apparatus for wireless communication. The apparatus may include a memory comprising instructions and one or more processors configured to execute the instructions. The one or more processors may be configured to execute the instructions and cause the apparatus to obtain, from an entity of an NTN, a SIB that indicates information relating to one or more NTN SIBs that are to include at least one of ephemeris information or feeder link timing advance information. The one or more processors may be configured to execute the instructions and cause the apparatus to obtain, from the entity of the NTN, the one or more NTN SIBs based at least in part on the information.

Some aspects described herein relate to an apparatus for wireless communication. The apparatus may include a memory comprising instructions and one or more processors configured to execute the instructions. The one or more processors may be configured to execute the instructions and cause the apparatus to output for transmission to a UE a SIB that indicates information relating to one or more NTN SIBs that are to include at least one of ephemeris information or feeder link timing advance information. The one or more processors may be configured to execute the instructions and cause the apparatus to output for transmission to the UE the one or more NTN SIBs based at least in part on the information.

Some aspects described herein relate to a non-transitory computer-readable medium comprising instructions. The instructions, when executed by one or more processors of an apparatus, may cause the apparatus to obtain, from an entity of an NTN, a SIB that indicates information relating to one or more NTN SIBs that are to include at least one of ephemeris information or feeder link timing advance information. The instructions, when executed by one or more processors of the apparatus, may cause the apparatus to obtain, from the entity of the NTN, the one or more NTN SIBs based at least in part on the information.

Some aspects described herein relate to a non-transitory computer-readable medium comprising instructions. The instructions, when executed by one or more processors of an apparatus, may cause the apparatus to output for transmission to a UE a SIB that indicates information relating to one or more NTN SIBs that are to include at least one of ephemeris information or feeder link timing advance information. The instructions, when executed by one or more processors of the apparatus, may cause the apparatus to output for transmission to the UE the one or more NTN SIBs based at least in part on the information.

Some aspects described herein relate to an apparatus for wireless communication. The apparatus may include means for obtaining, from an entity of an NTN, a SIB that indicates information relating to one or more NTN SIBs that are to include at least one of ephemeris information or feeder link timing advance information. The apparatus may include means for obtaining, from the entity of the NTN, the one or more NTN SIBs based at least in part on the information.

Some aspects described herein relate to an apparatus for wireless communication. The apparatus may include means for outputting for transmission to a UE a SIB that indicates information relating to one or more NTN SIBs that are to include at least one of ephemeris information or feeder link timing advance information. The apparatus may include means for outputting for transmission to the UE the one or more NTN SIBs based at least in part on the information.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
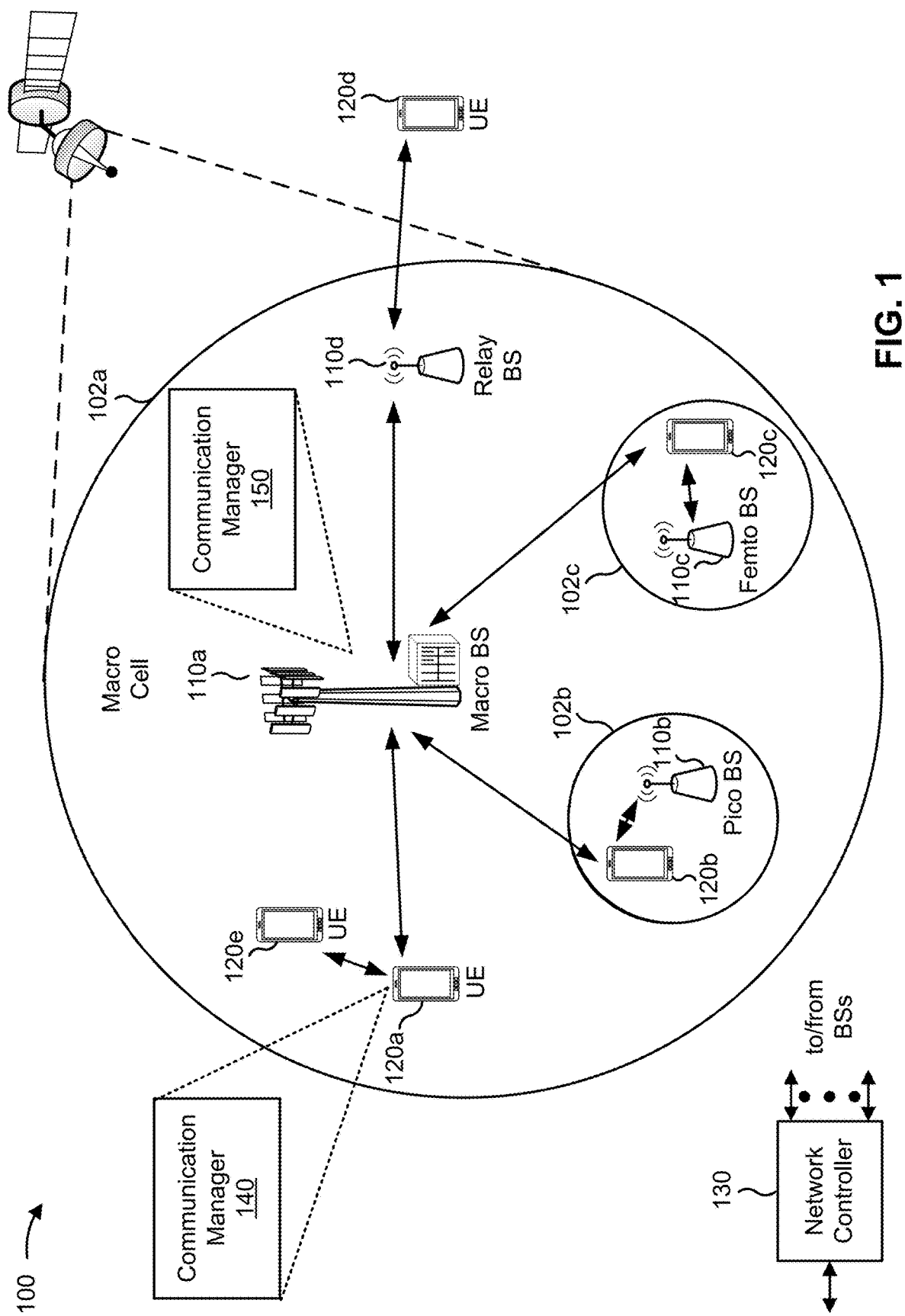
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

In some aspects, as shown in FIG. 1, a cell may be provided by a base station 110 of a non-terrestrial network. As used herein, "non-terrestrial network" (NTN) may refer to a network for which access is provided by a non-terrestrial base station, such as a base station carried by an NTN entity (e.g., satellite, a balloon, a dirigible, an airplane, an unmanned aerial vehicle, a high altitude platform station). A base station of the NTN may be a base station carried by the NTN entity (regenerative deployment) or a base station on the ground that communicates via the NTN entity (bent-pipe or transparent deployment).

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may obtain, from an entity of an NTN, a system information block (SIB) that indicates information relating to one or more NTN SIBs that are to include at least one of ephemeris information or feeder link timing advance information; and obtain, from the entity of the NTN, the one or more NTN SIBs based at least in part on the information. Additionally, or alternatively, the communication manager 140 may perform one or more other operations described herein.

In some aspects, the base station 110, or another NTN entity, may include a communication manager 150. As described in more detail elsewhere herein, the communication manager 150 may output for transmission to a UE a SIB that indicates information relating to one or more NTN SIBS that are to include at least one of ephemeris information or feeder link timing advance information; and output for transmission to the UE the one or more NTN SIBS based at least in part on the information. Additionally, or alternatively, the communication manager 150 may perform one or more other operations described herein.

As indicated above, FIG. 1 is provided as an example. Other examples may differ from what is described with regard to FIG. 1.

Figure 2:
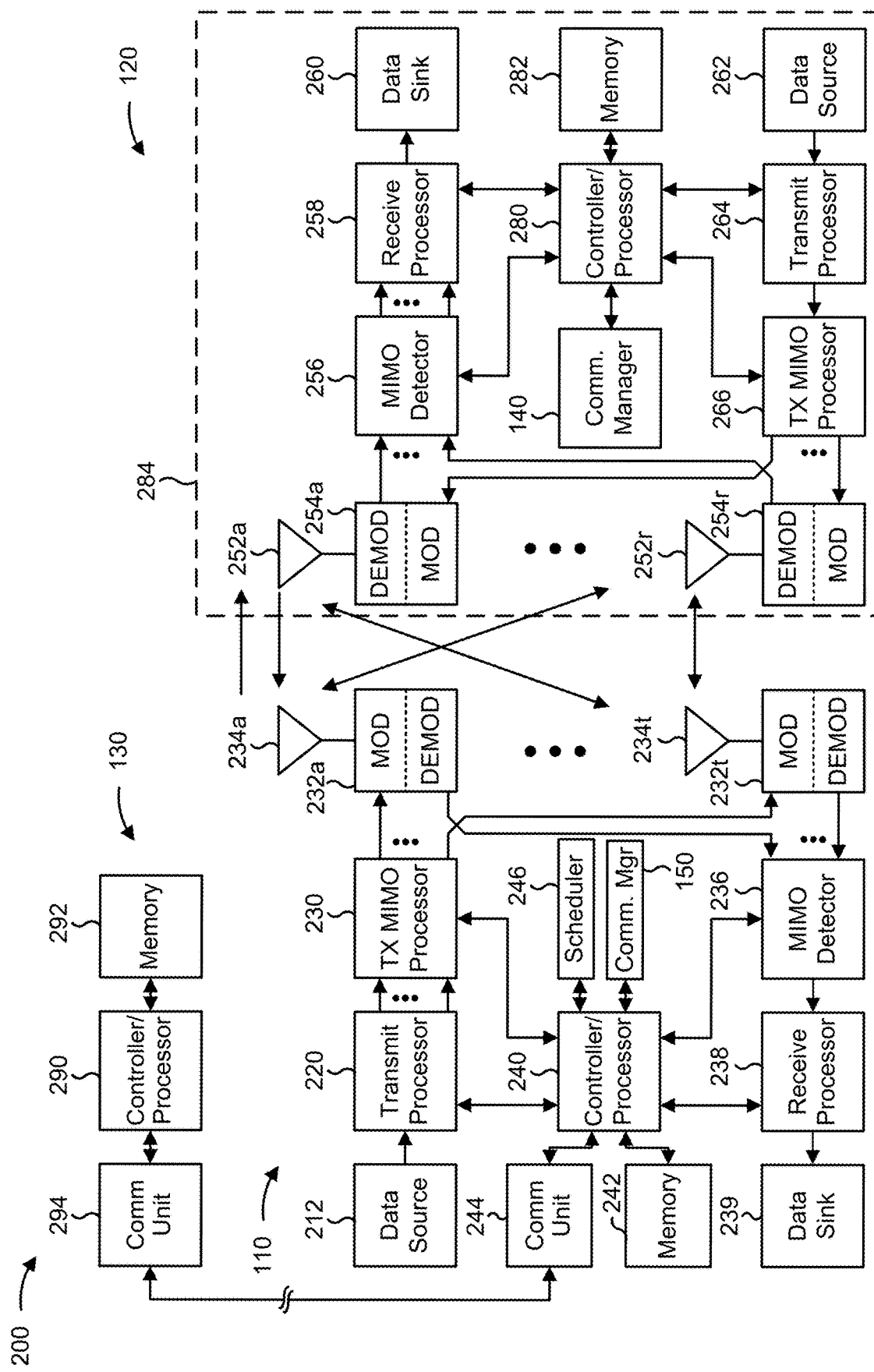
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 6-10).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 6-10).

The controller/processor 240 of the base station 110, the controller/processor 280 of the UE 120, and/or any other component(s) of FIG. 2 may perform one or more techniques associated with broadcasting of an NTN SIB, as described in more detail elsewhere herein. In some aspects, the NTN entity described herein is the base station 110, is included in the base station 110, or includes one or more components of the base station 110 shown in FIG. 2. For example, the controller/processor 240 of the base station 110, the controller/processor 280 of the UE 120, and/or any other component(s) of FIG. 2 may perform or direct operations of, for example, process 700 of FIG. 7, process 800 of FIG. 8, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7, process 800 of FIG. 8, and/or other processes as described herein. In some examples, executing instructions may include running the instructions, converting the instructions, compiling the instructions, and/or interpreting the instructions, among other examples.

In some aspects, the UE 120 includes means for obtaining, from an entity of an NTN, a SIB that indicates information relating to one or more NTN SIBs that are to include at least one of ephemeris information or feeder link timing advance information; and/or means for obtaining, from the entity of the NTN, the one or more NTN SIBs based at least in part on the information. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the base station 110, or another NTN entity, includes means for outputting for transmission to a UE a SIB that indicates information relating to one or more NTN SIBs that are to include at least one of ephemeris information or feeder link timing advance information; and/or means for outputting for transmission to the UE the one or more NTN SIBs based at least in part on the information. The means for the base station 110, or another NTN entity, to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
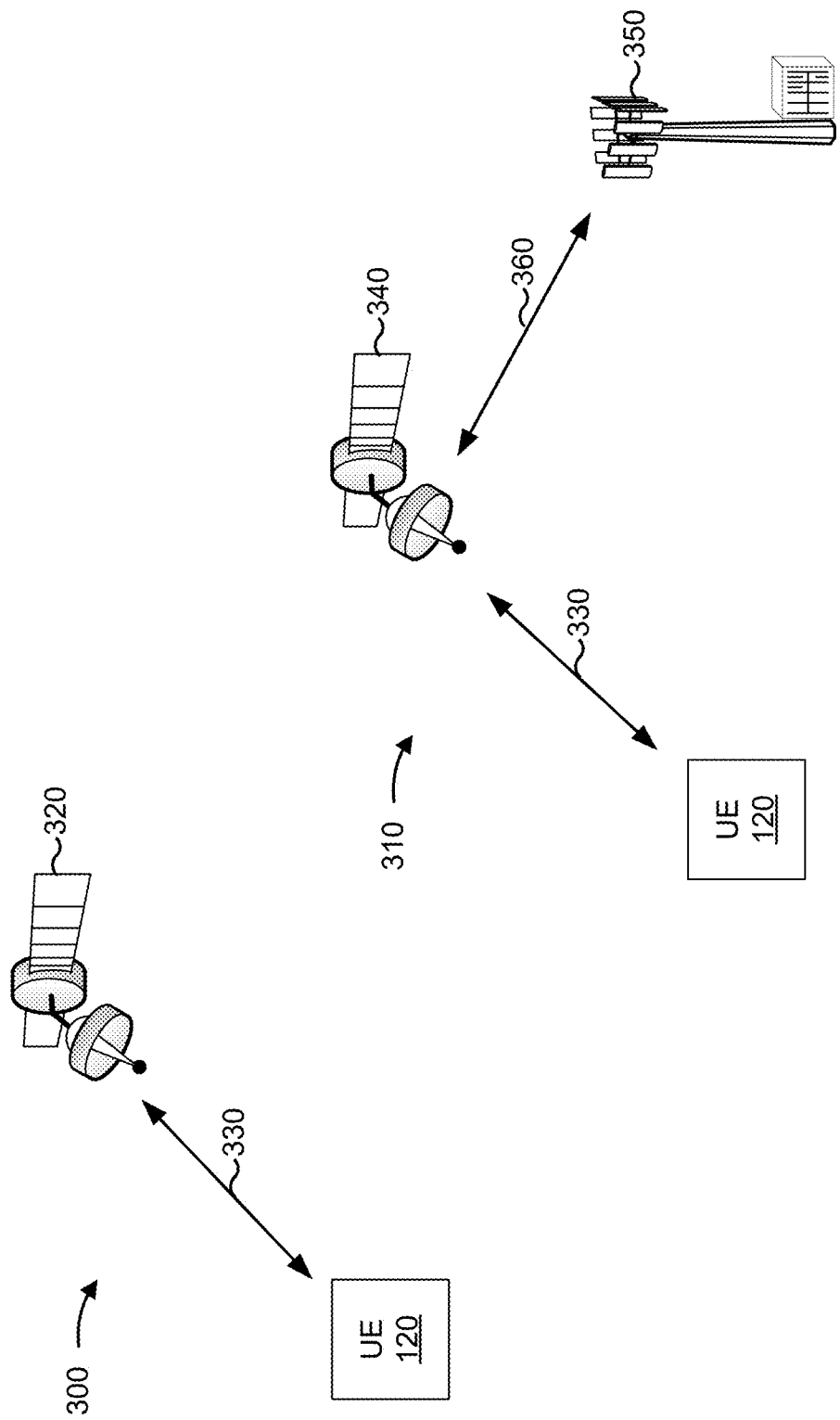
FIG. 3 is a diagram illustrating an example of a regenerative satellite deployment and an example of a transparent satellite deployment in a non-terrestrial network (NTN), in accordance with the present disclosure.

FIG. 3 is a diagram illustrating an example 300 of a regenerative satellite deployment and an example 310 of a transparent satellite deployment in an NTN, in accordance with the present disclosure.

Example 300 shows a regenerative satellite deployment. In example 300, a UE 120 is served by a satellite 320 via a service link 330. For example, the satellite 320 may include a base station 110 (e.g., base station 110*a*) or a gNB. In some aspects, the satellite 320 may be referred to as a non-terrestrial base station, a regenerative repeater, or an on-board processing repeater. In some aspects, the satellite 320 may demodulate an uplink radio frequency signal, and may modulate a baseband signal derived from the uplink radio signal to produce a downlink radio frequency transmission. The satellite 320 may transmit the downlink radio frequency signal on the service link 330. The satellite 320 may provide a cell that covers the UE 120.

Example 310 shows a transparent satellite deployment, which may also be referred to as a bent-pipe satellite deployment. In example 310, a UE 120 is served by a satellite 340 via the service link 330. The satellite 340 may be a transparent satellite. The satellite 340 may relay a signal received from gateway 350 via a feeder link 360. For example, the satellite may receive an uplink radio frequency transmission, and may transmit a downlink radio frequency transmission without demodulating the uplink radio frequency transmission. In some aspects, the satellite may frequency convert the uplink radio frequency transmission received on the service link 330 to a frequency of the uplink radio frequency transmission on the feeder link 360, and may amplify and/or filter the uplink radio frequency transmission. In some aspects, the UEs 120 shown in example 300 and example 310 may be associated with a Global Navigation Satellite System (GNSS) capability or a Global Positioning System (GPS) capability, though not all UEs have such capabilities. The satellite 340 may provide a cell that covers the UE 120.

The service link 330 may include a link between the satellite 340 and the UE 120, and may include one or more of an uplink or a downlink. The feeder link 360 may include a link between the satellite 340 and the gateway 350, and may include one or more of an uplink (e.g., from the UE 120 to the gateway 350) or a downlink (e.g., from the gateway 350 to the UE 120). An uplink of the service link 330 may be indicated by reference number 330-U (not shown in FIG. 3) and a downlink of the service link 330 may be indicated by reference number 330-D (not shown in FIG. 3). Similarly, an uplink of the feeder link 360 may be indicated by reference number 360-U (not shown in FIG. 3) and a downlink of the feeder link 360 may be indicated by reference number 360-D (not shown in FIG. 3).

The feeder link 360 and the service link 330 may each experience Doppler effects due to the movement of the satellites 320 and 340, and potentially movement of a UE 120. These Doppler effects may be significantly larger than in a terrestrial network. The Doppler effect on the feeder link 360 may be compensated for to some degree, but may still be associated with some amount of uncompensated frequency error. Furthermore, the gateway 350 may be associated with a residual frequency error, and/or the satellite 320/340 may be associated with an on-board frequency error. These sources of frequency error may cause a received downlink frequency at the UE 120 to drift from a target downlink frequency.

As indicated above, FIG. 3 is provided as an example. Other examples may differ from what is described with regard to FIG. 3.

Figure 4:
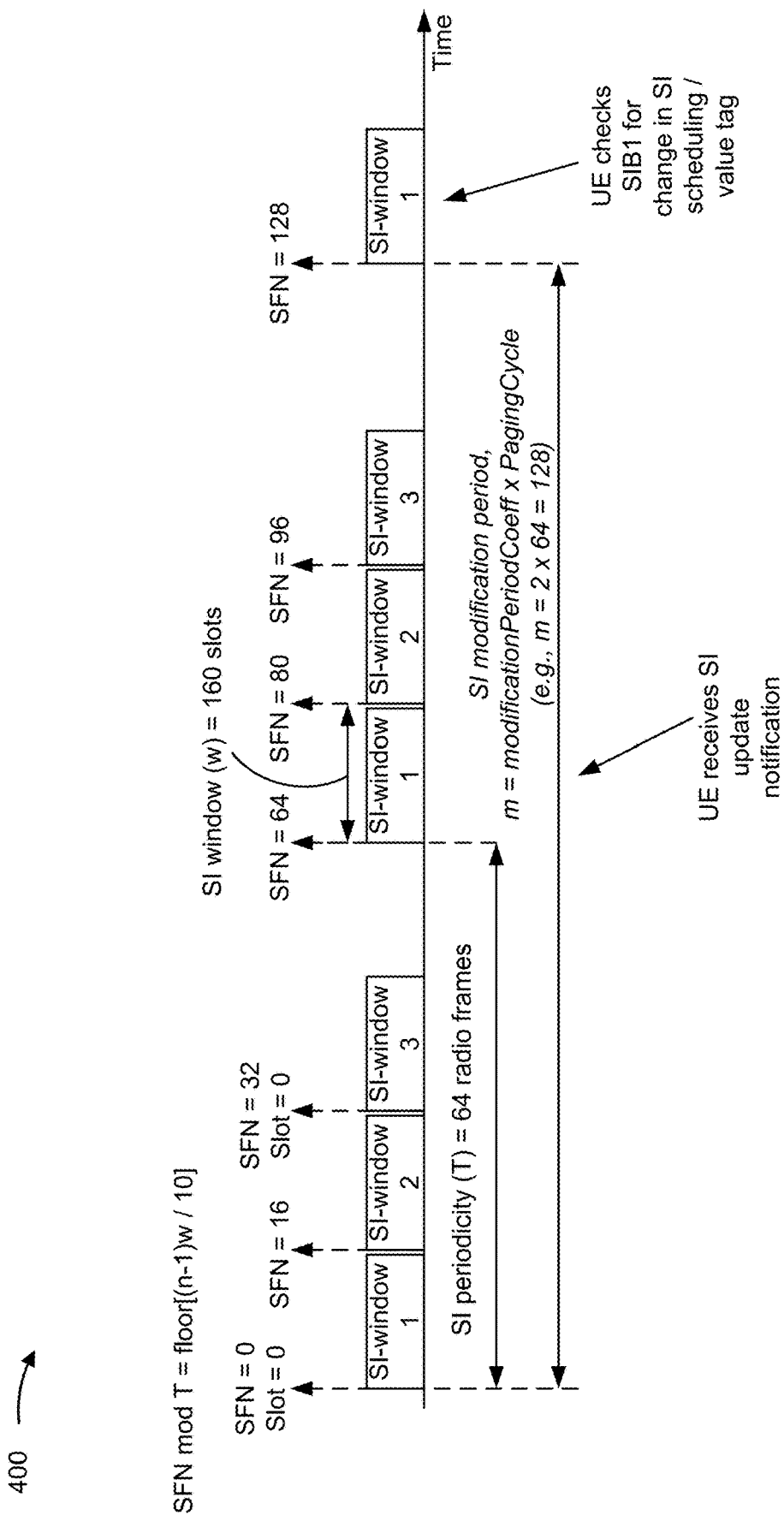
FIG. 4 is a diagram illustrating an example of system information scheduling, in accordance with the present disclosure.

FIG. 4 is a diagram illustrating an example 400 of system information scheduling, in accordance with the present disclosure.

A base station may provide system information (SI) for UEs covered by the base station. SI may include physical layer information (e.g., in a master information block), access information (e.g., in a SIB type 1 (SIB1)), and/or other information for communication between UEs and the base station (e.g., in one or more other types of SIBs). One or more SIBs may be carried in an SI message. For example, SIB1 may be carried alone in an SI message, and one or more other SIBs may be carried in another SI message.

An SI message carrying SIB1 may be transmitted at fixed time locations, which may facilitate identification of SIB1. In some examples, SIB1 carries scheduling information for other SI messages, and the other SI messages are transmitted in non-overlapping scheduling windows (e.g., scheduling windows that do not overlap each other or the window of SIB1). Thus, when the UE receives, in a physical downlink control channel (PDCCH), downlink control information (DCI) identifying an SI message, the UE may know which SI message is being scheduled based at least in part on the scheduling windows as indicated by the scheduling information of SIB1.

The scheduling information of SIB1 may indicate an SI window length (e.g., si-Window Length), which is a common parameter for SI messages. That is, the SI window length is the same for all scheduled SI messages. The SI window length may define the length of an SI window in which a UE can expect a SIB message (e.g., which may carry one or multiple SIBs) to be transmitted. A UE may use a particular formula to determine a time location of the start of an SI window. In an SI window, a UE may search a PDCCH (e.g., perform decoding of control communications using an SI radio network temporary identifier (SI-RNTI)) to receive an SI message. The scheduling information in SIB1 also may indicate an SI periodicity (e.g., si-Periodicity), per SI message, that identifies a time gap between consecutive SI windows (e.g., each SI message may have a separately configured SI periodicity).

A change to the information in an SI message may occur only after an upcoming boundary of an SI modification period (unless the SI message is for an earthquake and tsunami warning system (ETWS), a commercial mobile alert system (CMAS), positioning assistance data, a SIB type 9 (SIB9), or the like). Multiple SI windows may occur between SI modification boundaries for repetitions or retransmissions of an SI message (e.g., without change to the information in the SI message).

As shown in FIG. 4, a boundary of an SI modification period may be defined by system frame number (SFN) values for which SFN mod m=0, where m is the number of radio frames in an SI modification period. In some aspects, the value of m may be determined based on a configured coefficient value (e.g., modificationPeriodCoeff), which may have a value of 2, 4, 8, or 16, and a default paging cycle (e.g., PagingCycle), which may have a value of 32, 64, 128, or 256 radio frames. For example, as shown, in cases where the configured coefficient value is two and the default paging cycle is 64 radio frames, the SI modification period may include 128 radio frames (e.g., corresponding to 1.28 seconds). Continuing with the example, a new SIB1 can be acquired at SFN mod 128=0 (e.g., after the SI modification period boundary). A UE may acquire a new SIB1, after an SI modification period boundary, if the UE receives an SI update notification prior to the SI modification period boundary. If the UE receives the SI update notification, the UE may receive SIB1 after the SI modification period to check for a change to SI scheduling information and/or a value tag (e.g., valueTag) parameter. In a case where a SIB1 stored by a UE is valid (i.e., a SIB1 change notification is not received), all other SIBs (e.g., for scheduling and/or content) also may be considered as valid (e.g., not changed).

As shown in FIG. 4, if three SI messages are scheduled, then an SI period may include three non-overlapping SI windows. SI may also be transmitted on demand of a UE, in which case an SI window may be present, but the SI message is not broadcast. Within an SI window, an SI message may be transmitted one or more times. However, a SIB is included in only a single SI message, and the SIB is included within the SI message at most once.

As indicated above, FIG. 4 is provided as an example. Other examples may differ from what is described with respect to FIG. 4.

Figure 5:
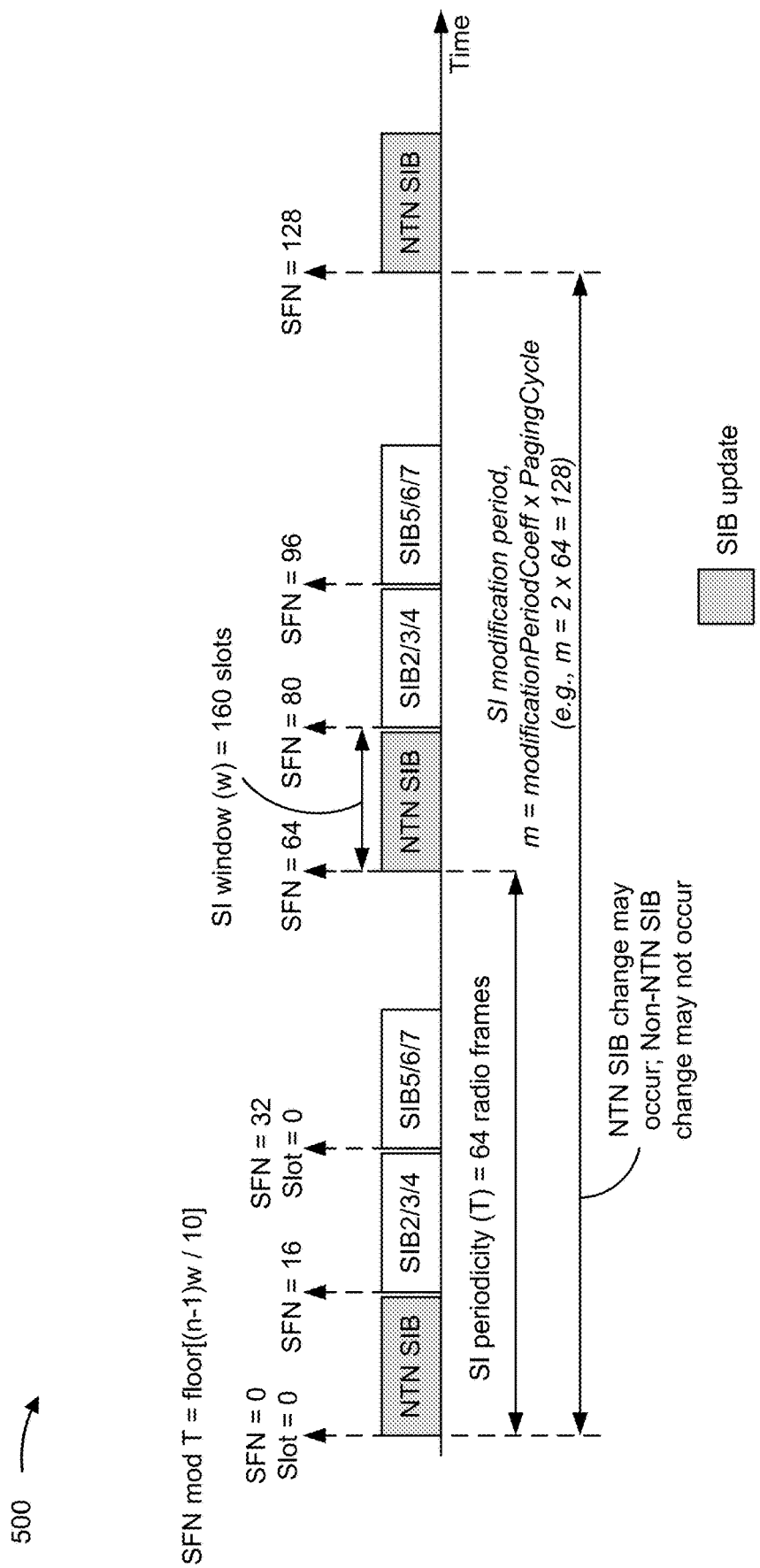
FIG. 5 is a diagram illustrating an example of transmission of an NTN-specific system information block (SIB), in accordance with the present disclosure.

FIG. 5 is a diagram illustrating an example 500 of transmission of an NTN-specific SIB, in accordance with the present disclosure. The NTN-specific SIB (which may be referred to herein as an NTN SIB) is a SIB that carries information for communication in an NTN. For example, the NTN SIB may carry ephemeris information and/or feeder link timing advance information. The feeder link timing advance information may indicate a round trip delay of a whole or a part of a feeder link that is common to multiple UEs. An NTN SIB may be a new SIB type that can be indicated by a SIB type information parameter (e.g., SIB-TypeInfo) of SIB1.

As shown in FIG. 5, an SI window may have a length (w) of 160 slots, and an NTN SIB may be first among multiple scheduled SIBs (i.e., n=1 for the NTN SIB). An SI periodicity (T) may be configured as a value from 80 milliseconds (ms) to 5.12 seconds. As shown in FIG. 5, a periodicity for an SI message that includes an NTN SIB may be 640 ms (e.g., T=64 radio frames). In other words, the NTN SIB may have updated ephemeris information and/or updated feeder link timing advance information every 640 ms. Thus, as shown, a UE may acquire updated ephemeris information and/or feeder link timing advance information (e.g., an updated NTN SIB) at SFN=0, SFN=64, or SFN=128, and so forth (e.g., where a slot number (a) for acquiring the updated NTN SIB is expressed as slot a=(n−1)w mod 10).

However, if an SI modification period is greater than 640 ms (e.g., m=128 radio frames, or 1.28 seconds, as shown), then an update of the NTN SIB every 640 ms is not possible in current wireless networks. Thus, a network should be enabled to update an NTN SIB without notifying a UE (e.g., via a SI update notification paging message). In other words, the NTN SIB may change without a change to a scheduling parameter for SI or a change to the version (e.g., systemInfoValueTag) of SIB1.

As indicated above, FIG. 5 is provided as an example. Other examples may differ from what is described with respect to FIG. 5.

Ephemeris information may describe a trajectory of a satellite in an NTN (e.g., the ephemeris information may include parameters such as a reference time, or so-called "epoch time," that specifies the time at which orbital parameters are taken, Keplerian orbital parameters such as a square root of a semi-major axis, an eccentricity, and/or an inclination angle, and/or perturbation parameters such as a mean motion difference from a computed value, a rate of change of right ascension and/or inclination, and/or amplitudes of one or more sine or cosine harmonic correction terms, among other examples). For example, ephemeris information may indicate a formula that can be used by a UE to predict a position of the satellite over time. A maximum modification periodicity for ephemeris information may be from 10 seconds to 60 seconds, and a transmission periodicity for ephemeris information may be less than one second (e.g., which may be determined based at least in part on an initial access delay). A UE may determine when to read ephemeris information based at least in part on an uplink timing error budget of the UE and/or an ephemeris prediction error associated with the UE.

Feeder link timing advance information may indicate a timing advance to be used by a UE due to a delay associated with a feeder link between a gateway and a satellite of an NTN. Feeder link timing advance information may indicate a feeder link timing advance without timing drift (e.g., a timing advance value that does not account for timing drift over time) or a feeder link timing advance with timing drift (e.g., a timing advance formula that accounts for timing drift over time).

A modification periodicity for a feeder link timing advance without timing drift may be greater than 20 seconds (e.g., assuming a 0.5 ms granularity), and a transmission periodicity for a feeder link timing advance without timing drift may be less than one second (e.g., which may be determined based at least in part on an initial access delay).

A UE may read feeder link timing advance information, for a timing advance without timing drift, before an effective time of the information (e.g., which may be delayed relative to a signaling time of the information). In some examples, feeder link timing advance information, for a timing advance without timing drift, may indicate a formula that a UE can use to determine a timing advance, thereby reducing reading of feeder link timing advance information by the UE (e.g., the formula may indicate an increase from a common offset by one slot every 30 seconds).

A maximum modification periodicity for a feeder link timing advance with timing drift may be from 10 seconds to 20 seconds in FR1 or from 2 seconds to 5 seconds in FR2, and a transmission periodicity for a feeder link timing advance with timing drift may be less than one second (e.g., which may be determined based at least in part on an initial access delay). A UE may read feeder link timing advance information immediately upon an update of the information if a common timing advance offset (e.g., without timing drift) is used. Otherwise, if timing drift is used, the UE may delay reading the information for a time period after the update of the information (however, prediction error of the UE may deteriorate quickly beyond the time period).

As described above, an NTN SIB carrying ephemeris information and/or timing advance information (e.g., with timing drift) should be updated periodically. An update periodicity for the NTN SIB may be constrained by a need for a reference time (e.g., epoch time) update, which also may lead to an update of the contents of the NTN SIB. For example, a reference time used by a UE should be a latest time relative to reception of a message in order to reduce prediction error (ephemeris prediction performed by a network may be more accurate than ephemeris prediction performed by a UE due to the network's use of sophisticated prediction models). In some examples, a reference time (e.g., epoch time) may be implicitly indicated to a UE in order to reduce signaling overhead. For example, the reference time may be based at least in part on a boundary of a downlink signal (e.g., for an NTN SIB).

In a case where ephemeris information is updated each SI period via an NTN SIB, repetitions of the NTN SIB may be transmitted within an SI period. Here, the repetitions of the NTN SIB within the SI period may be associated with the same reference time. That is, a single reference time may be used per SI period. A network may predict a position and/or a velocity of the satellite of the NTN at the reference time (e.g., a time at an end of a slot of a first transmission within a period leaving the satellite) based at least in part on a latest GNSS read.

Accordingly, in an NTN, there are some SI parameters that are handled differently than terrestrial networks due to a need to periodically update the SI parameters as the position of a satellite changes relative to the ground. For example, because ephemeris information is used to describe the trajectory of a satellite in the sky, ephemeris information is generally specific to an NTN and there are no ephemeris-like SI parameters in a terrestrial network. In another example, a feeder link timing advance also may be based at least in part on a position of the satellite, whereas a timing advance used in a terrestrial network does not need to account for movement of a satellite.

In general, when one or more SI parameters are updated, a UE is typically notified via a paging message, and the UE is then expected to reacquire one or more SIBs to refresh the one or more SI parameters. However, transmitting a paging message to inform the UE when SI parameters need to be updated may lead to signaling overhead, which may be particularly problematic in an NTN due to large propagation delays and/or satellite motion potentially resulting in frequent changes to the SI parameters. Moreover, SI parameters for an NTN, such as ephemeris information and feeder link timing advance information, may need to be updated more frequently than an SI modification period permits. If such SI parameters are not updated with the requisite frequency, a UE may lose synchronization with a base station or a satellite, communications to or from the UE may fail, or the like.

In some techniques and apparatuses described herein, scheduling information for an NTN SIB may be provided in a SIB (e.g., SIB1). In some aspects, an update period for an NTN SIB, as well as transmission windows for an NTN SIB within an SI period may be indicated in SIB1. In some aspects, SIB1 may include an indication of a validity duration and/or an accuracy of an NTN SIB. In some aspects, SIB1 may include a resource allocation and/or an MCS for an NTN SIB to avoid a need to schedule an NTN SIB via a PDCCH.

Techniques described herein enable updating of ephemeris information and/or feeder link timing advance information without triggering an SI update procedure via a paging message. For example, a UE may acquire updated ephemeris information and/or feeder link timing advance information in accordance with the scheduling information in SIB1 and without notification to the UE via paging. In this way, signaling overhead is reduced. Moreover, as described above, a UE may receive a resource allocation for an NTN SIB in SIB1, rather than via a PDCCH, thereby further reducing signaling overhead.

Figure 6:
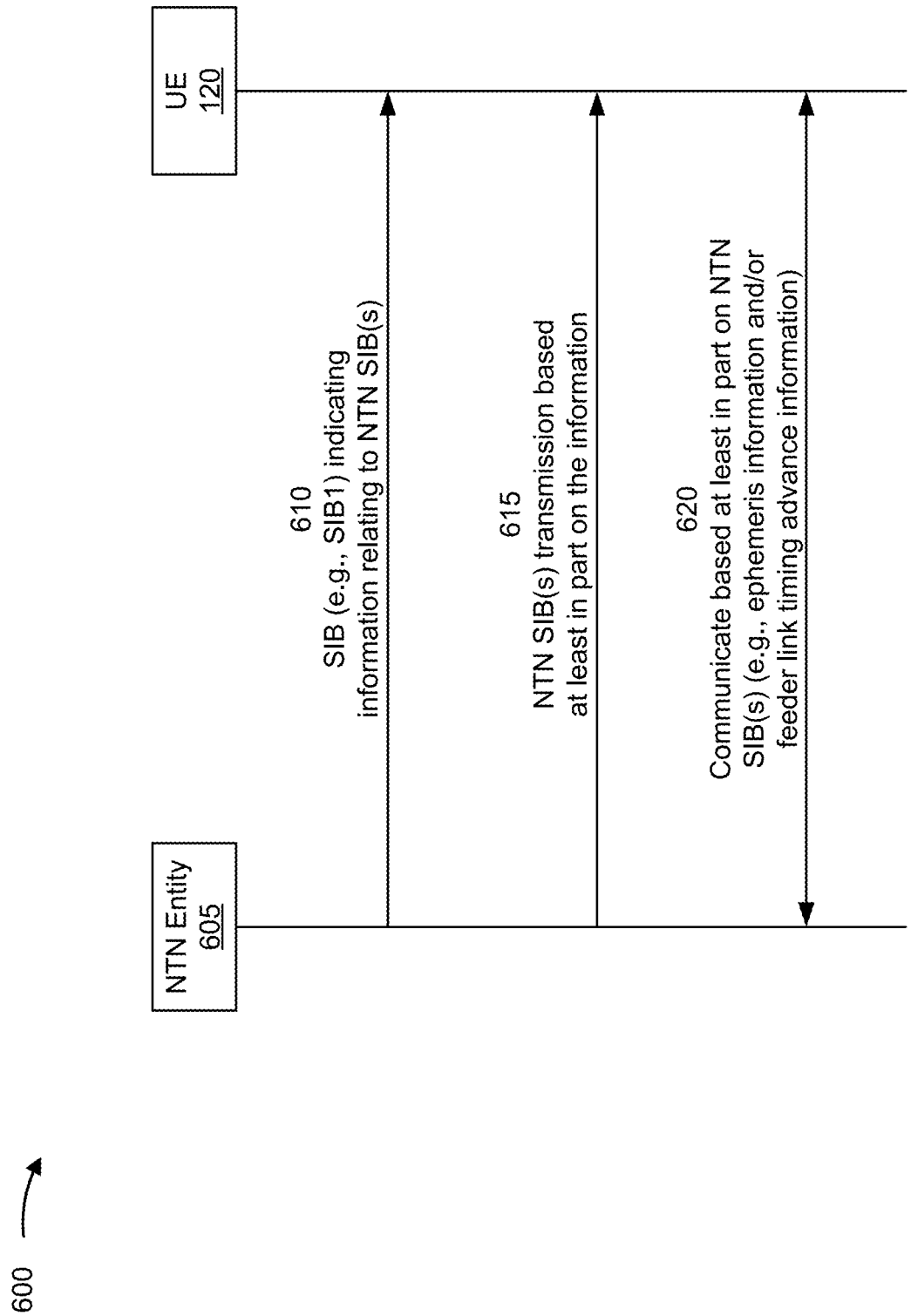
FIG. 6 is a diagram illustrating an example associated with broadcasting of an NTN SIB, in accordance with the present disclosure.

FIG. 6 is a diagram illustrating an example 600 associated with broadcasting of an NTN SIB, in accordance with the present disclosure. As shown in FIG. 6, example 600 includes communication between an NTN entity 605 and a UE 120. In some aspects, the NTN entity 605 and the UE 120 may be included in a wireless network, such as wireless network 100 (e.g., an NTN). In some aspects, the NTN entity 605 may be a base station 110 of the NTN, a gateway 350 of the NTN, a satellite 320 of the NTN, a satellite 340 of the NTN, or the like.

As shown by reference number 610, the NTN entity 605 may transmit, and the UE 120 may receive, a SIB that indicates information relating to one or more NTN SIBs. As described herein, the NTN SIB(s) may include at least one of ephemeris information or feeder link timing advance information (e.g., for a timing advance with timing drift or a timing advance without timing drift). In some aspects, the SIB that indicates the information also may carry access information. For example, the SIB that indicates the information may be a SIB1.

In some aspects, the information relating to the one or more NTN SIBs may indicate an update periodicity for the one or more NTN SIBs (e.g., for an SI message that includes the one or more NTN SIBs) and/or may indicate one or more transmission windows (also referred to herein as scheduling windows or SI windows) within an update period for the one or more NTN SIBs (e.g., for an SI message that includes the one or more NTN SIBs). The update periodicity may be an SI periodicity, as described herein, at which the ephemeris information and/or the feeder link timing advance information is updated. An update period may be an SI period, as described herein, that is defined by the update periodicity and that includes one or more transmission windows for repetitions or retransmissions of the one or more NTN SIBs (e.g., of an SI message that includes the one or more NTN SIBs). The SIB may indicate the information relating to the one or more NTN SIBs (e.g., the update periodicity and/or the transmission windows) separately from (e.g., using different parameter types than) information relating to one or more non-NTN SIBS (e.g., an update periodicity and/or transmission windows) indicated in the SIB.

In aspects where a PDCCH is used to schedule a physical downlink shared channel (PDSCH) communication of the NTN SIB(s), a transmission window may be for the NTN entity 605 to transmit, and the UE 120 to receive, a PDCCH communication that schedules the PDSCH communication (e.g., the transmission window is for PDCCH decoding). In aspects where a PDCCH is not used, a transmission window may be for the NTN entity 605 to transmit, and the UE 120 to receive, the PDSCH communication of the NTN SIB(s) (e.g., a PDSCH communication of the ephemeris information and/or the feeder link timing advance information).

In some aspects, a default update periodicity (e.g., used if an update periodicity is not indicated) for the one or more NTN SIBs may be the same as a periodicity (e.g., a default periodicity or an indicated periodicity in SIB1) for one or more non-NTN SIBs (e.g., a SIB type 2 (SIB2), a SIB type 3 (SIB3), and so forth). In some aspects, one or more repetitions of an NTN SIB, within an update period, may be associated with the same reference time (e.g., an epoch time, or the like). For example, SI messages of ephemeris information transmitted in a single update period may use the same reference time. However, different SIBs or information elements transmitted within an update period may be associated with different reference times.

In some aspects, a reference time for the NTN SIB(s) (e.g., for one or more repetitions of an NTN SIB that are associated with the same reference time) may be based at least in part on a particular downlink transmit timepoint (e.g., with respect to a satellite) within an update period. For example, a reference time for SI messages of ephemeris information may be a particular downlink timepoint, within an update period, at a satellite of the NTN. The downlink transmit timepoint used for the reference time may be configured, specified, or otherwise provisioned for the UE 120 to thereby enable implicit indication of the reference time to the UE 120, as described herein. The downlink transmit timepoint, for example if a transmission window is specified, may be an end of a last downlink slot of a PDSCH carrying an NTN SIB (e.g., carrying the ephemeris information and/or the feeder link timing advance information) of a first transmission window of an update period at the satellite. The downlink transmit timepoint, for example if a transmission window is not specified, may be an end of a first downlink slot of an update period at the satellite.

In some aspects, the information relating to the one or more NTN SIBs may indicate a resource allocation and/or an MCS for reception of the NTN SIB(s) at the UE 120. In this way, the UE 120 can receive a PDSCH communication of the NTN SIB(s) based at least in part on the resource allocation and/or the MCS indicated in the information, and a PDCCH does not need to be used to schedule the PDSCH communication. A time domain resource allocation, of the resource allocation, may be with respect to (e.g., referenced to) a start of a transmission window for the one or more NTN SIBs. In some aspects, the information relating to the one or more NTN SIBs may indicate a message size of the one or more NTN SIBs. For example, the information may include an indication of the message size if an NTN SIB may use a variable message size.

In some aspects, the information relating to the one or more NTN SIBs may indicate a validity duration and/or an accuracy (e.g., referenced to a particular accuracy per sub-carrier spacing) of the one or more NTN SIBs. The validity duration and/or the accuracy may be indicated in a unit of the update period (e.g., indicated as a multiplier of the update period). In some aspects, the information may indicate a first validity duration and/or a first accuracy of the ephemeris information and a second validity duration and/or a second accuracy of the feeder link timing advance information.

In some aspects, a mechanism (e.g., an si-Periodicity parameter in SIB1) for indicating scheduling information for one or more non-NTN SIBs (e.g., SIB2, SIB3, and so forth), as described herein, may also be used to indicate scheduling information for one or more NTN SIBs. For example, the information relating to the one or more NTN SIBs may indicate an update periodicity for the one or more NTN SIBs using a parameter type (e.g., an si-Periodicity parameter type) of the SIB that is also used to indicate a periodicity for one or more non-NTN SIBs. In other words, an update period for an NTN SIB may be defined (e.g., in SIB1) the same way as an SI period for another SIB. An update period may have a size that is small enough to accommodate a random access channel (RACH) delay. In some aspects, one or more SI windows (e.g., a first SI window and a third SI window of an SI period) may be specified or defined for transmission of an NTN SIB.

In some aspects, the information relating to the one or more NTN SIBs may indicate an identifier of an entry in a table stored by the UE 120. The table (e.g., a lookup table) may identify various combinations of an update periodicity for an NTN SIB, transmission windows within an update period for an NTN SIB (e.g., a PDCCH or a PDSCH of the NTN SIB), a time domain resource allocation for an NTN SIB, a frequency domain resource allocation for an NTN SIB, an MCS for an NTN SIB, and/or a message size of an NTN SIB. Accordingly, the identifier may indicate, according to the table, a particular combination of an update periodicity for an NTN SIB, transmission windows within an update period for an NTN SIB, a time domain resource allocation for an NTN SIB, a frequency domain resource allocation for an NTN SIB, an MCS for an NTN SIB, and/or a message size of an NTN SIB.

In some aspects, the one or more NTN SIBs may include a single NTN SIB that includes the ephemeris information and the feeder link timing advance information (e.g., the ephemeris information and the feeder link timing advance information may be sent together in one NTN SIB). In some aspects, the one or more NTN SIBs may include multiple NTN SIBs that respectively include the ephemeris information and the feeder link timing advance information (e.g., the ephemeris information may be sent in a first NTN SIB and the feeder link timing advance information may be sent in a second NTN SIB).

In some aspects, if the feeder link timing advance information indicates a feeder link timing advance with timing drift, then the information relating to the one or more NTN SIBs may provide respective indications of a validity duration and/or an accuracy for the ephemeris information and the feeder link timing advance information (e.g., when the ephemeris information and the feeder link timing advance information are sent together in one NTN SIB). For example, the information may indicate a first validity duration and/or a first accuracy of the ephemeris information and a second validity duration and/or a second accuracy of the feeder link timing advance information, as described above. In some aspects, if the feeder link timing advance information indicates a feeder link timing advance without timing drift, then an update periodicity for the feeder link timing advance information may be based at least in part on an update periodicity for the ephemeris information (e.g., when the ephemeris information and the feeder link timing advance information are sent together in one NTN SIB). For example, the update periodicity for the feeder link timing advance information may be indicated in a unit of the update periodicity for the ephemeris information.

In some aspects, if the feeder link timing advance information indicates a feeder link timing advance without timing drift, the information relating to the one or more NTN SIBs may indicate the feeder link timing advance information (e.g., SIB1 indicates the feeder link timing advance information, rather than such information being indicated in an NTN SIB). Here, an update to the feeder link timing advance information may use a system information update procedure, as described herein. In some aspects, if the feeder link timing advance information indicates a feeder link timing advance without timing drift, the information relating to the one or more NTN SIBs may indicate an update periodicity for the feeder link timing advance information and/or an update period for the feeder link timing advance information (e.g., but may not indicate a validity duration and/or an accuracy for the feeder link timing advance information).

In some aspects, if the feeder link timing advance information indicates a feeder link timing advance without timing drift, an application time (e.g., by the UE 120) of the feeder link timing advance information may be based at least in part on a last slot number (m) of a first PDSCH communication of the one or more NTN SIBs in an update period, or a last slot number (m) of a first transmission window, of the one or more transmission windows, in an update period, and a system scheduling offset value ($K_{offset}$). For example, an application time of the feeder link timing advance (e.g., a common offset) may be in uplink slot number m+$K_{offset}$+x, where x is a constant value, such as 1 or 2.

As described herein, an update periodicity for an NTN SIB may indicate a periodicity at which the ephemeris information and/or the feeder link timing advance information is updated. Thus, an update to the one or more NTN SIBs may include the (updated) ephemeris information and/or the feeder link timing advance information without triggering (e.g., is independent of triggering) a system information update procedure. That is, the update does not trigger SIB modification and associated paging, as described herein.

As shown by reference number 615, the NTN entity 605 may transmit, and the UE 120 may receive, the one or more NTN SIBs based at least in part on the information relating to the one or more NTN SIBs in the SIB (e.g., in SIB1). For example, the UE 120 may receive the one or more NTN SIBs in accordance with an indicated update periodicity (e.g., within an update period according to the update periodicity), one or more indicated transmission windows, an indicated resource allocation and/or MCS, or the like. As described herein, in each update period (e.g., and without SI update notification paging), the UE 120 may receive one or more updated NTN SIBs that include updated ephemeris information and/or updated feeder link timing advance information.

As shown by reference number 620, the UE 120 and the NTN entity 605 may communicate based at least in part on the one or more NTN SIBs. That is, the UE 120 and the NTN entity 605 may communicate based at least in part on the ephemeris information and/or the feeder link timing advance information. For example, the UE 120 may communicate with the NTN entity 605 using the ephemeris information and/or the feeder link timing advance information (e.g., in accordance with a reference time, a validity duration, and/or an accuracy, as described herein).

As indicated above, FIG. 6 is provided as an example. Other examples may differ from what is described with respect to FIG. 6.

Figure 7:
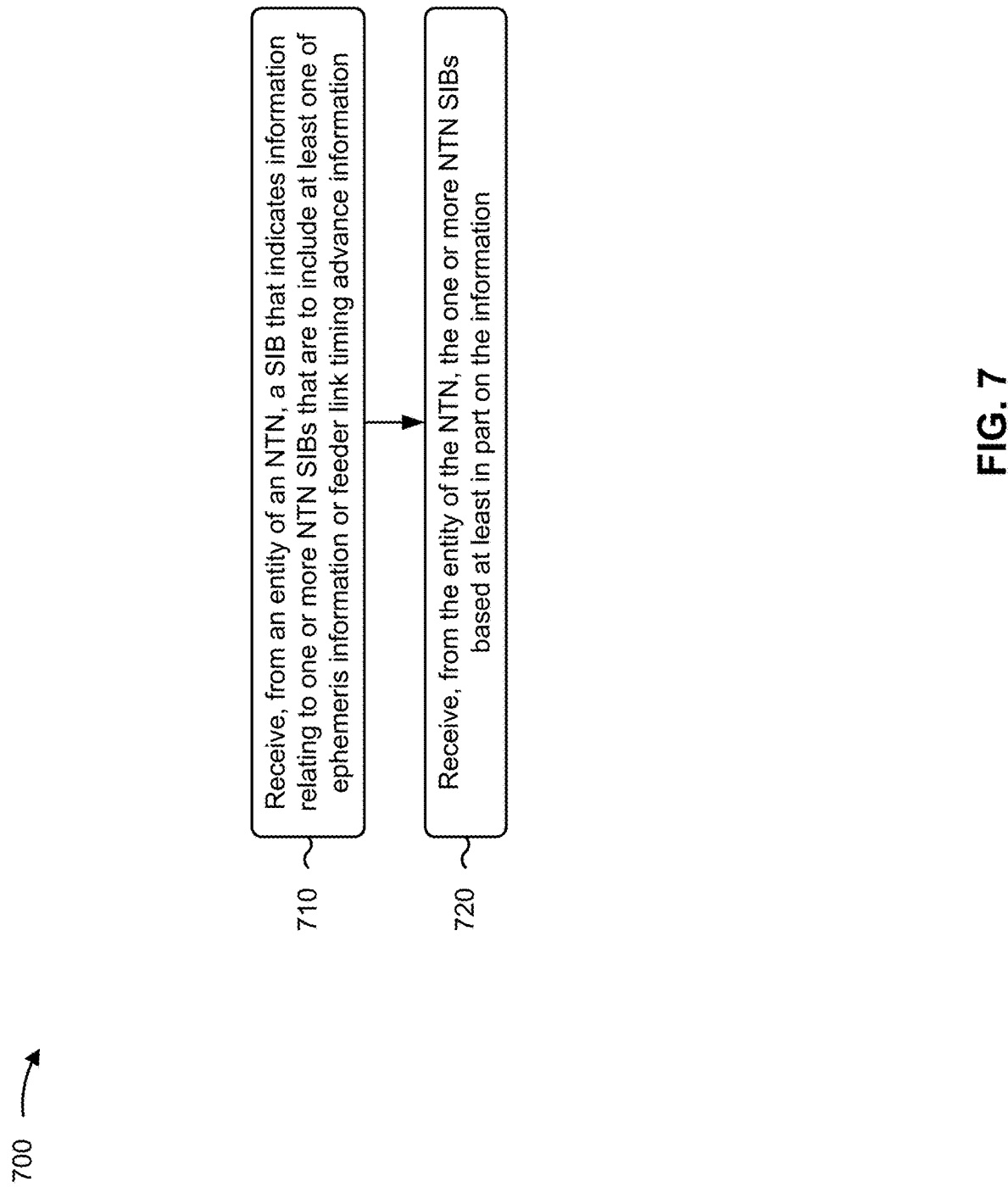
FIGS. 7-8 are diagrams illustrating example processes associated with broadcasting of an NTN SIB, in accordance with the present disclosure.

FIG. 7 is a diagram illustrating an example process 700 performed, for example, by a UE, in accordance with the present disclosure. Example process 700 is an example where the UE (e.g., UE 120) performs operations associated with broadcasting of an NTN SIB.

As shown in FIG. 7, in some aspects, process 700 may include receiving, from an entity of an NTN, a SIB that indicates information relating to one or more NTN SIBs that are to include at least one of ephemeris information or feeder link timing advance information (block 710). For example, the UE (e.g., using communication manager 140 and/or reception component 902, depicted in FIG. 9) may receive, from an entity of an NTN, a SIB that indicates information relating to one or more NTN SIBs that are to include at least one of ephemeris information or feeder link timing advance information, as described above.

As further shown in FIG. 7, in some aspects, process 700 may include receiving, from the entity of the NTN, the one or more NTN SIBs based at least in part on the information (block 720). For example, the UE (e.g., using communication manager 140 and/or reception component 902, depicted in FIG. 9) may receive, from the entity of the NTN, the one or more NTN SIBs based at least in part on the information, as described above.

Process 700 may include additional aspects, such as any single aspect or any combination of aspects described below and/or in connection with one or more other processes described elsewhere herein.

In a first aspect, the information indicates at least one of an update periodicity for the one or more NTN SIBs or one or more transmission windows within an update period for the one or more NTN SIBs.

In a second aspect, alone or in combination with the first aspect, the one or more transmission windows are for reception of a PDCCH communication that schedules the one or more NTN SIBs.

In a third aspect, alone or in combination with one or more of the first and second aspects, the one or more transmission windows are for reception of a PDSCH communication of the one or more NTN SIBs.

In a fourth aspect, alone or in combination with one or more of the first through third aspects, a default update periodicity for the one or more NTN SIBs is the same as a periodicity for one or more non-NTN SIBS.

In a fifth aspect, alone or in combination with one or more of the first through fourth aspects, one or more repetitions of an NTN SIB, of the one or more NTN SIBs, within an update period, are associated with a same reference time.

In a sixth aspect, alone or in combination with one or more of the first through fifth aspects, a reference time for the one or more NTN SIBs is based at least in part on a particular downlink transmit timepoint within an update period.

In a seventh aspect, alone or in combination with one or more of the first through sixth aspects, the information indicates at least one of a resource allocation or an MCS for reception of the one or more NTN SIBS.

In an eighth aspect, alone or in combination with one or more of the first through seventh aspects, a time domain resource allocation of the resource allocation is with respect to a start of a transmission window for the one or more NTN SIBs.

In a ninth aspect, alone or in combination with one or more of the first through eighth aspects, the information further indicates a message size of the one or more NTN SIBs.

In a tenth aspect, alone or in combination with one or more of the first through ninth aspects, the information indicates at least one of a validity duration or an accuracy of the one or more NTN SIBS.

In an eleventh aspect, alone or in combination with one or more of the first through tenth aspects, the information indicates an update periodicity for the one or more NTN SIBs using a parameter type of the SIB that is also used to indicate a periodicity for one or more non-NTN SIBs.

In a twelfth aspect, alone or in combination with one or more of the first through eleventh aspects, an update to the one or more NTN SIBs includes at least one of the ephemeris information or the feeder link timing advance information without triggering a system information update procedure.

In a thirteenth aspect, alone or in combination with one or more of the first through twelfth aspects, the information indicates an identifier that indicates, according to a table, one or more of an update periodicity for the one or more NTN SIBs, one or more transmission windows within an update period for the one or more NTN SIBS, a time domain resource allocation for the one or more NTN SIBs, a frequency domain resource allocation for the one or more NTN SIBs, an MCS, or a message size of the one or more NTN SIBS.

In a fourteenth aspect, alone or in combination with one or more of the first through thirteenth aspects, the one or more NTN SIBs include a single NTN SIB that includes the ephemeris information and the feeder link timing advance information.

In a fifteenth aspect, alone or in combination with one or more of the first through fourteenth aspects, the feeder link timing advance information indicates a feeder link timing advance with timing drift, and the information indicates at least one of a first validity duration or a first accuracy of the ephemeris information and at least one of a second validity duration or a second accuracy of the feeder link timing advance information.

In a sixteenth aspect, alone or in combination with one or more of the first through fifteenth aspects, the feeder link timing advance information indicates a feeder link timing advance without timing drift, and an update periodicity for the feeder link timing advance information is based at least in part on an update periodicity for the ephemeris information.

In a seventeenth aspect, alone or in combination with one or more of the first through sixteenth aspects, the one or more NTN SIBs include multiple NTN SIBs that respectively include the ephemeris information and the feeder link timing advance information.

In an eighteenth aspect, alone or in combination with one or more of the first through seventeenth aspects, the information indicates the feeder link timing advance information, and the feeder link timing advance information indicates a feeder link timing advance without timing drift.

In a nineteenth aspect, alone or in combination with one or more of the first through eighteenth aspects, the feeder link timing advance information indicates a feeder link timing advance without timing drift, and the information indicates at least one of an update periodicity for the feeder link timing advance information or an update period for the feeder link timing advance information.

In a twentieth aspect, alone or in combination with one or more of the first through nineteenth aspects, the feeder link timing advance information indicates a feeder link timing advance without timing drift, and an application time of the feeder link timing advance information is based at least in part on a last slot number of a first PDSCH communication of the one or more NTN SIBS or a last slot number of a first transmission window in an update period, and a system scheduling offset value.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
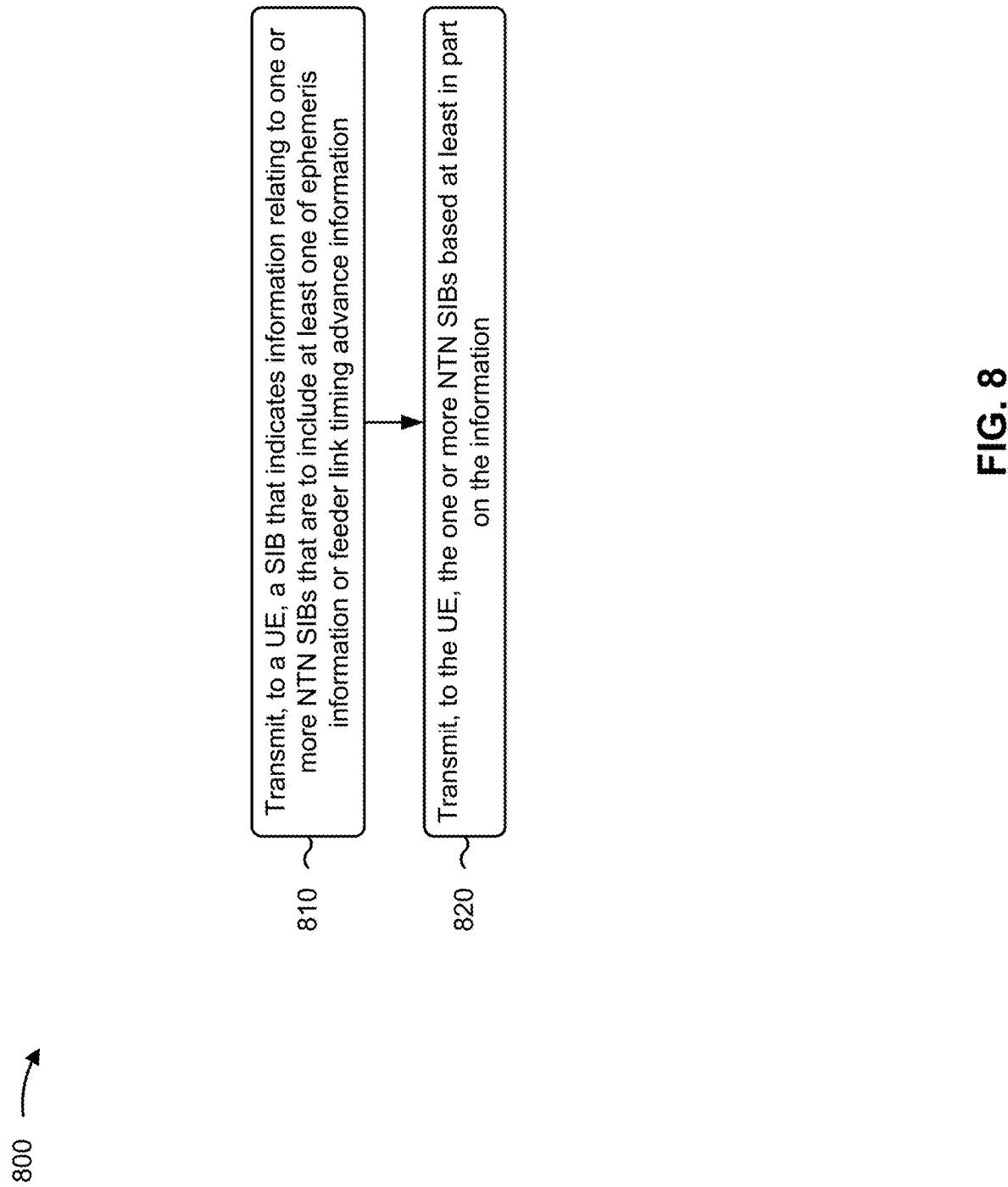

FIG. 8 is a diagram illustrating an example process 800 performed, for example, by an NTN entity, in accordance with the present disclosure. Example process 800 is an example where the NTN entity (e.g., base station 110, satellite 320, satellite 340, gateway 350, or the like) performs operations associated with broadcasting of an NTN SIB.

As shown in FIG. 8, in some aspects, process 800 may include transmitting, to a UE, a SIB that indicates information relating to one or more NTN SIBs that are to include at least one of ephemeris information or feeder link timing advance information (block 810). For example, the NTN entity (e.g., using communication manager 150 and/or transmission component 1004, depicted in FIG. 10) may transmit, to a UE, a SIB that indicates information relating to one or more NTN SIBs that are to include at least one of ephemeris information or feeder link timing advance information, as described above.

As further shown in FIG. 8, in some aspects, process 800 may include transmitting, to the UE, the one or more NTN SIBs based at least in part on the information (block 820). For example, the NTN entity (e.g., using communication manager 150 and/or transmission component 1004, depicted in FIG. 10) may transmit, to the UE, the one or more NTN SIBs based at least in part on the information, as described above.

Process 800 may include additional aspects, such as any single aspect or any combination of aspects described below and/or in connection with one or more other processes described elsewhere herein.

In a first aspect, the information indicates at least one of an update periodicity for the one or more NTN SIBs or one or more transmission windows within an update period for the one or more NTN SIBs.

In a second aspect, alone or in combination with the first aspect, the one or more transmission windows are for transmission of a PDCCH communication that schedules the one or more NTN SIBs.

In a third aspect, alone or in combination with one or more of the first and second aspects, the one or more transmission windows are for transmission of a PDSCH communication of the one or more NTN SIBs.

In a fourth aspect, alone or in combination with one or more of the first through third aspects, a default update periodicity for the one or more NTN SIBs is the same as a periodicity for one or more non-NTN SIBs.

In a fifth aspect, alone or in combination with one or more of the first through fourth aspects, one or more repetitions of an NTN SIB, of the one or more NTN SIBs, within an update period, are associated with a same reference time.

In a sixth aspect, alone or in combination with one or more of the first through fifth aspects, a reference time for the one or more NTN SIBs is based at least in part on a particular downlink transmit timepoint within an update period.

In a seventh aspect, alone or in combination with one or more of the first through sixth aspects, the information indicates at least one of a resource allocation or an MCS for reception of the one or more NTN SIBS.

In an eighth aspect, alone or in combination with one or more of the first through seventh aspects, a time domain resource allocation of the resource allocation is with respect to a start of a transmission window for the one or more NTN SIBs.

In a ninth aspect, alone or in combination with one or more of the first through eighth aspects, the information further indicates a message size of the one or more NTN SIBs.

In a tenth aspect, alone or in combination with one or more of the first through ninth aspects, the information indicates at least one of a validity duration or an accuracy of the one or more NTN SIBS.

In an eleventh aspect, alone or in combination with one or more of the first through tenth aspects, the information indicates an update periodicity for the one or more NTN SIBs using a parameter type of the SIB that is also used to indicate a periodicity for one or more non-NTN SIBs.

In a twelfth aspect, alone or in combination with one or more of the first through eleventh aspects, an update to the one or more NTN SIBs includes at least one of the ephemeris information or the feeder link timing advance information without triggering a system information update procedure.

In a thirteenth aspect, alone or in combination with one or more of the first through twelfth aspects, the information indicates an identifier that indicates, according to a table, one or more of an update periodicity for the one or more NTN SIBs, one or more transmission windows within an update period for the one or more NTN SIBS, a time domain resource allocation for the one or more NTN SIBs, a frequency domain resource allocation for the one or more NTN SIBs, an MCS, or a message size of the one or more NTN SIBS.

In a fourteenth aspect, alone or in combination with one or more of the first through thirteenth aspects, the one or more NTN SIBs include a single NTN SIB that includes the ephemeris information and the feeder link timing advance information.

In a fifteenth aspect, alone or in combination with one or more of the first through fourteenth aspects, the feeder link timing advance information indicates a feeder link timing advance with timing drift, and the information indicates at least one of a first validity duration or a first accuracy of the ephemeris information and at least one of a second validity duration or a second accuracy of the feeder link timing advance information.

In a sixteenth aspect, alone or in combination with one or more of the first through fifteenth aspects, the feeder link timing advance information indicates a feeder link timing advance without timing drift, and an update periodicity for the feeder link timing advance information is based at least in part on an update periodicity for the ephemeris information.

In a seventeenth aspect, alone or in combination with one or more of the first through sixteenth aspects, the one or more NTN SIBs include multiple NTN SIBs that respectively include the ephemeris information and the feeder link timing advance information.

In an eighteenth aspect, alone or in combination with one or more of the first through seventeenth aspects, the information indicates the feeder link timing advance information, and the feeder link timing advance information indicates a feeder link timing advance without timing drift.

In a nineteenth aspect, alone or in combination with one or more of the first through eighteenth aspects, the feeder link timing advance information indicates a feeder link timing advance without timing drift, and the information indicates at least one of an update periodicity for the feeder link timing advance information or an update period for the feeder link timing advance information.

In a twentieth aspect, alone or in combination with one or more of the first through nineteenth aspects, the feeder link timing advance information indicates a feeder link timing advance without timing drift, and an application time of the feeder link timing advance information is based at least in part on a last slot number of a first PDSCH communication of the one or more NTN SIBS or a last slot number of a first transmission window in an update period, and a system scheduling offset value.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
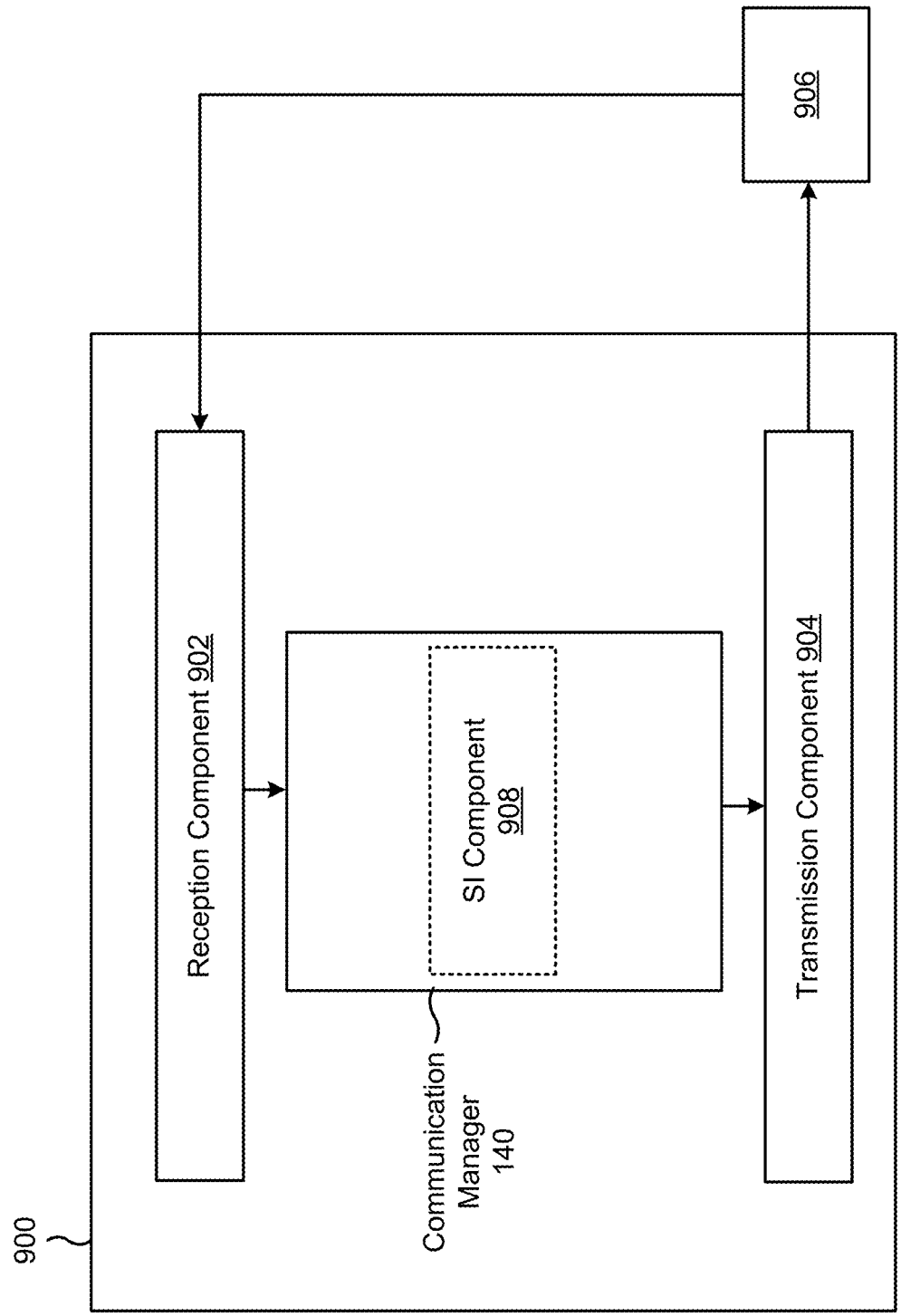
FIGS. 9-10 are diagrams of example apparatuses for wireless communication, in accordance with the present disclosure.

FIG. 9 is a diagram of an example apparatus 900 for wireless communication. The apparatus 900 may be a UE, or a UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include the communication manager 140. The communication manager 140 may include an SI component 908, among other examples.

In some aspects, the apparatus 900 may be configured to perform one or more operations described herein in connection with FIG. 6. Additionally, or alternatively, the apparatus 900 may be configured to perform one or more processes described herein, such as process 700 of FIG. 7, or a combination thereof. In some aspects, the apparatus 900 and/or one or more components shown in FIG. 9 may include one or more components of the UE described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the UE described in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the UE described in connection with FIG. 2. In some aspects, the transmission component 904 may be co-located with the reception component 902 in a transceiver.

The reception component 902 may receive, from an entity of an NTN (e.g., apparatus 906), a SIB that indicates information relating to one or more NTN SIBs that are to include at least one of ephemeris information or feeder link timing advance information. The reception component 902 may receive, from the entity of the NTN, the one or more NTN SIBs based at least in part on the information. The reception component 902 and/or the transmission component 904 may communicate with the NTN entity based at least in part on the one or more NTN SIBs. The SI component 908 may process, store, apply, or the like, SI (e.g., the ephemeris information and/or the feeder link timing advance information) in the one or more NTN SIBs.

In some examples, means for transmitting, outputting, or sending (or means for outputting for transmission) may include one or more antennas, a modulator, a transmit MIMO processor, a transmit processor, or a combination thereof, of the UE described above in connection with FIG. 2.

In some examples, means for receiving (or means for obtaining) may include one or more antennas, a demodulator, a MIMO detector, a receive processor, or a combination thereof, of the UE described above in connection with FIG. 2.

In some cases, rather than actually transmitting, for example, signals and/or data, a device may have an interface to output signals and/or data for transmission (a means for outputting). For example, a processor may output signals and/or data, via a bus interface, to an RF front end for transmission. Similarly, rather than actually receiving signals and/or data, a device may have an interface to obtain the signals and/or data received from another device (a means for obtaining). For example, a processor may obtain (or receive) the signals and/or data, via a bus interface, from an RF front end for reception. In various aspects, an RF front end may include various components, including transmit and receive processors, transmit and receive MIMO processors, modulators, demodulators, and the like, such as depicted in the examples in FIG. 2.

In some examples, means for determining, means for obtaining, or means for sending may include various processing system components, such as a receive processor, a transmit processor, a controller/processor, a memory, or a combination thereof, of the UE described above in connection with FIG. 2.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
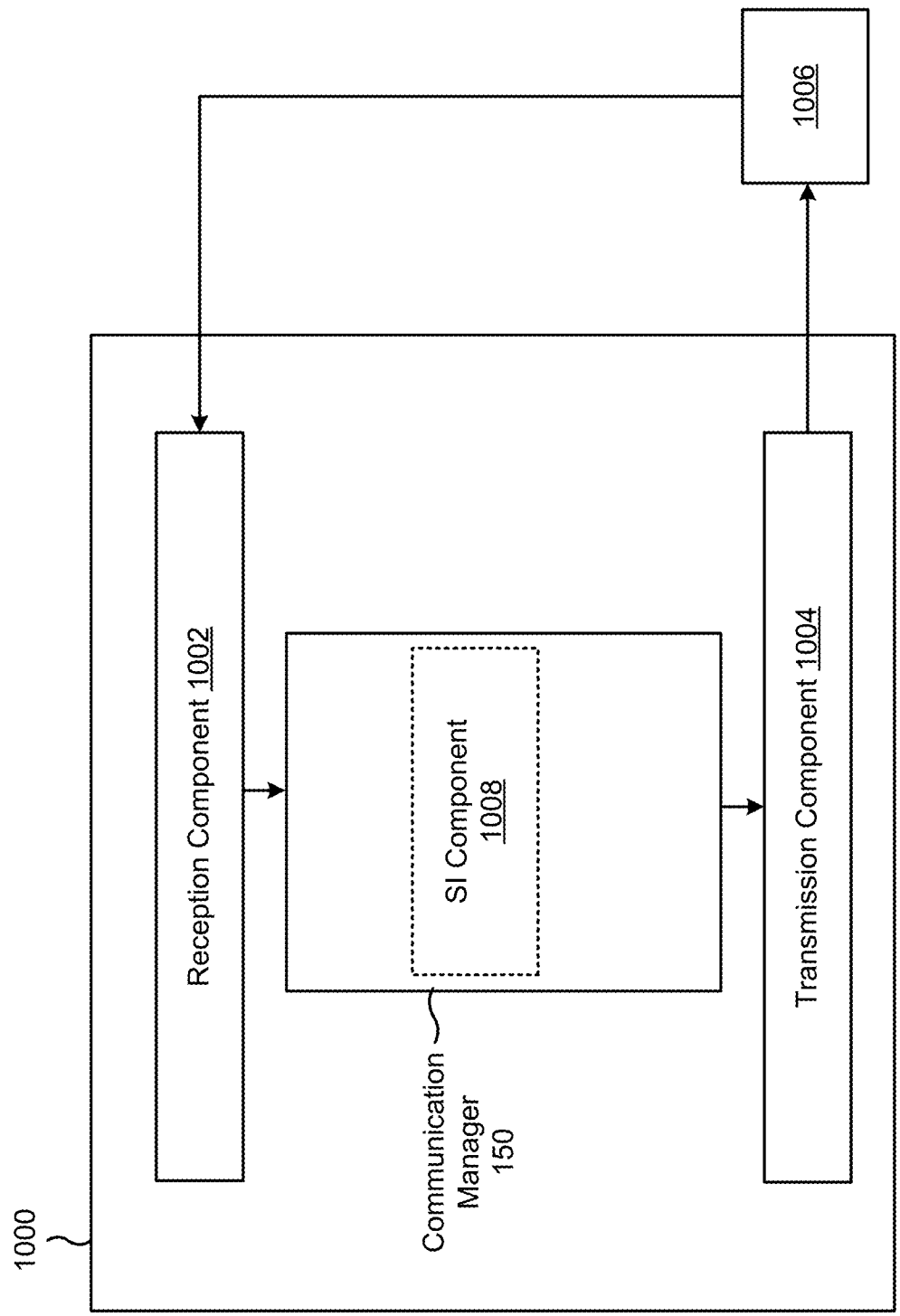

FIG. 10 is a diagram of an example apparatus 1000 for wireless communication. The apparatus 1000 may be a base station or another NTN entity, or a base station or another NTN entity may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include the communication manager 150. The communication manager 150 may include an SI component 1008, among other examples.

In some aspects, the apparatus 1000 may be configured to perform one or more operations described herein in connection with FIG. 6. Additionally, or alternatively, the apparatus 1000 may be configured to perform one or more processes described herein, such as process 800 of FIG. 8, or a combination thereof. In some aspects, the apparatus 1000 and/or one or more components shown in FIG. 10 may include one or more components of the base station described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the base station described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the base station described in connection with FIG. 2. In some aspects, the transmission component 1004 may be co-located with the reception component 1002 in a transceiver.

The transmission component 1004 may transmit, to a UE (e.g., apparatus 1006), a SIB that indicates information relating to one or more NTN SIBs that are to include at least one of ephemeris information or feeder link timing advance information. The transmission component 1004 may transmit, to the UE, the one or more NTN SIBs based at least in part on the information. The reception component 1002 and/or the transmission component 1004 may communicate with the UE based at least in part on the one or more NTN SIBs. The SI component 1008 may generate, process, store, or the like SI (e.g., the ephemeris information and/or the feeder link timing advance information) for the one or more NTN SIBs.

In some examples, means for transmitting, outputting, or sending (or means for outputting for transmission) may include one or more antennas, a modulator, a transmit MIMO processor, a transmit processor, or a combination thereof, of the base station or another NTN entity described above in connection with FIG. 2.

In some examples, means for receiving (or means for obtaining) may include one or more antennas, a demodulator, a MIMO detector, a receive processor, or a combination thereof, of the base station or another NTN entity described above in connection with FIG. 2.

In some cases, rather than actually transmitting, for example, signals and/or data, a device may have an interface to output signals and/or data for transmission (a means for outputting). For example, a processor may output signals and/or data, via a bus interface, to an RF front end for transmission. Similarly, rather than actually receiving signals and/or data, a device may have an interface to obtain the signals and/or data received from another device (a means for obtaining). For example, a processor may obtain (or receive) the signals and/or data, via a bus interface, from an RF front end for reception. In various aspects, an RF front end may include various components, including transmit and receive processors, transmit and receive MIMO processors, modulators, demodulators, and the like, such as depicted in the examples in FIG. 2.

In some examples, means for determining, means for obtaining, or means for sending may include various processing system components, such as a receive processor, a transmit processor, a controller/processor, a memory, or a combination thereof, of the base station or another NTN entity described above in connection with FIG. 2.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication at a user equipment (UE), comprising: obtaining, from an entity of a non-terrestrial network (NTN), a system information block (SIB) that indicates information relating to one or more NTN SIBs that are to include at least one of ephemeris information or feeder link timing advance information; and obtaining, from the entity of the NTN, the one or more NTN SIBs based at least in part on the information.

Aspect 2: The method of Aspect 1, wherein the information indicates at least one of an update periodicity for the one or more NTN SIBs or one or more transmission windows within an update period for the one or more NTN SIBs.

Aspect 3: The method of Aspect 2, wherein the one or more transmission windows are for reception of a physical downlink control channel communication that schedules the one or more NTN SIBs.

Aspect 4: The method of Aspect 2, wherein the one or more transmission windows are for reception of a physical downlink shared channel communication of the one or more NTN SIBs.

Aspect 5: The method of any of Aspects 1-4, wherein a default update periodicity for the one or more NTN SIBs is the same as a periodicity for one or more non-NTN SIBs.

Aspect 6: The method of any of Aspects 1-5, wherein one or more repetitions of an NTN SIB, of the one or more NTN SIBs, within an update period, are associated with a same reference time.

Aspect 7: The method of any of Aspects 1-6, wherein a reference time for the at least one of the ephemeris information or the feeder link timing advance information of the one or more NTN SIBS is based at least in part on a particular downlink transmit timepoint within an update period.

Aspect 8: The method of any of Aspects 1-7, wherein the information indicates at least one of a resource allocation or a modulation and coding scheme for reception of the one or more NTN SIBs.

Aspect 9: The method of Aspect 8, wherein a time domain resource allocation of the resource allocation is with respect to a start of a transmission window for the one or more NTN SIBs.

Aspect 10: The method of any of Aspects 8-9, wherein the information further indicates a message size of the one or more NTN SIBs.

Aspect 11: The method of any of Aspects 1-10, wherein the information indicates at least one of a validity duration or an accuracy of the one or more NTN SIBS.

Aspect 12: The method of any of Aspects 1 or 5-11, wherein the information indicates an update periodicity for the one or more NTN SIBs using a parameter type of the SIB that is also used to indicate a periodicity for one or more non-NTN SIBs.

Aspect 13: The method of any of Aspects 1-11, wherein an update to the at least one of the ephemeris information or the feeder link timing advance information is independent of triggering a system information update procedure.

Aspect 14: The method of any of Aspects 1, 5-11, or 13, wherein the information indicates an identifier that indicates, according to a table, one or more of an update periodicity for the one or more NTN SIBs, one or more transmission windows within an update period for the one or more NTN SIBs, a time domain resource allocation for the one or more NTN SIBs, a frequency domain resource allocation for the one or more NTN SIBs, a modulation and coding scheme, or a message size of the one or more NTN SIBS.

Aspect 15: The method of any of Aspects 1-14, wherein the one or more NTN SIBs include a single NTN SIB that includes the ephemeris information and the feeder link timing advance information.

Aspect 16: The method of Aspect 15, wherein the feeder link timing advance information indicates a feeder link timing advance with timing drift, and wherein the information indicates at least one of a first validity duration or a first accuracy of the ephemeris information and at least one of a second validity duration or a second accuracy of the feeder link timing advance information.

Aspect 17: The method of Aspect 15, wherein the feeder link timing advance information indicates a feeder link timing advance without timing drift, and wherein an update periodicity for the feeder link timing advance information is based at least in part on an update periodicity for the ephemeris information.

Aspect 18: The method of any of Aspects 1-14, wherein the one or more NTN SIBS include multiple NTN SIBs that respectively include the ephemeris information and the feeder link timing advance information.

Aspect 19: The method of any of Aspects 1-14, wherein the information indicates the feeder link timing advance information, and the feeder link timing advance information indicates a feeder link timing advance without timing drift.

Aspect 20: The method of any of Aspects 1-15 or 17-18, wherein the feeder link timing advance information indicates a feeder link timing advance without timing drift, and wherein the information indicates at least one of an update periodicity for the feeder link timing advance information or an update period for the feeder link timing advance information.

Aspect 21: The method of any of Aspects 1-15, 17-18, or 20, wherein the feeder link timing advance information indicates a feeder link timing advance without timing drift, and wherein an application time of the feeder link timing advance information is based at least in part on a last slot number of a first physical downlink shared channel communication of the one or more NTN SIBS or a last slot number of a first transmission window in an update period, and a system scheduling offset value.

Aspect 22: A method of wireless communication at an entity of a non-terrestrial network (NTN), comprising: outputting for transmission to a user equipment (UE) a system information block (SIB) that indicates information relating to one or more NTN SIBs that are to include at least one of ephemeris information or feeder link timing advance information; and outputting for transmission to the UE, the one or more NTN SIBS based at least in part on the information.

Aspect 23: The method of Aspect 22, wherein the information indicates at least one of an update periodicity for the one or more NTN SIBs or one or more transmission windows within an update period for the one or more NTN SIBs.

Aspect 24: The method of Aspect 23, wherein the one or more transmission windows are for transmission of a physical downlink control channel communication that schedules the one or more NTN SIBs.

Aspect 25: The method of Aspect 23, wherein the one or more transmission windows are for transmission of a physical downlink shared channel communication of the one or more NTN SIBs.

Aspect 26: The method of any of Aspects 22-25, wherein a default update periodicity for the one or more NTN SIBs is the same as a periodicity for one or more non-NTN SIBs.

Aspect 27: The method of any of Aspects 22-26, wherein one or more repetitions of an NTN SIB, of the one or more NTN SIBs, within an update period, are associated with a same reference time.

Aspect 28: The method of any of Aspects 22-27, wherein a reference time for the at least one of the ephemeris information or the feeder link timing advance information of the one or more NTN SIBs is based at least in part on a particular downlink transmit timepoint within an update period.

Aspect 29: The method of any of Aspects 22-28, wherein the information indicates at least one of a resource allocation or a modulation and coding scheme for reception of the one or more NTN SIBs.

Aspect 30: The method of Aspect 29, wherein a time domain resource allocation of the resource allocation is with respect to a start of a transmission window for the one or more NTN SIBs.

Aspect 31: The method of any of Aspects 29-30, wherein the information further indicates a message size of the one or more NTN SIBs.

Aspect 32: The method of any of Aspects 22-31, wherein the information indicates at least one of a validity duration or an accuracy of the one or more NTN SIBs.

Aspect 33: The method of any of Aspects 22 or 26-32, wherein the information indicates an update periodicity for the one or more NTN SIBs using a parameter type of the SIB that is also used to indicate a periodicity for one or more non-NTN SIBS.

Aspect 34: The method of any of Aspects 22-32, wherein an update to the at least one of the ephemeris information or the feeder link timing advance information is independent of triggering a system information update procedure.

Aspect 35: The method of any of Aspects 22, 26-32, or 34 wherein the information indicates an identifier that indicates, according to a table, one or more of an update periodicity for the one or more NTN SIBs, one or more transmission windows within an update period for the one or more NTN SIBs, a time domain resource allocation for the one or more NTN SIBs, a frequency domain resource allocation for the one or more NTN SIBs, a modulation and coding scheme, or a message size of the one or more NTN SIBS.

Aspect 36: The method of any of Aspects 22-35, wherein the one or more NTN SIBs include a single NTN SIB that includes the ephemeris information and the feeder link timing advance information.

Aspect 37: The method of Aspect 36, wherein the feeder link timing advance information indicates a feeder link timing advance with timing drift, and wherein the information indicates at least one of a first validity duration or a first accuracy of the ephemeris information and at least one of a second validity duration or a second accuracy of the feeder link timing advance information.

Aspect 38: The method of Aspect 36, wherein the feeder link timing advance information indicates a feeder link timing advance without timing drift, and wherein an update periodicity for the feeder link timing advance information is based at least in part on an update periodicity for the ephemeris information.

Aspect 39: The method of any of Aspects 22-35, wherein the one or more NTN SIBs include multiple NTN SIBs that respectively include the ephemeris information and the feeder link timing advance information.

Aspect 40: The method of any of Aspects 22-35, wherein the information indicates the feeder link timing advance information, and the feeder link timing advance information indicates a feeder link timing advance without timing drift.

Aspect 41: The method of any of Aspects 22-36 or 38-39, wherein the feeder link timing advance information indicates a feeder link timing advance without timing drift, and wherein the information indicates at least one of an update periodicity for the feeder link timing advance information or an update period for the feeder link timing advance information.

Aspect 42: The method of any of Aspects 22-36, 38-39, or 41, wherein the feeder link timing advance information indicates a feeder link timing advance without timing drift, and wherein an application time of the feeder link timing advance information is based at least in part on a last slot number of a first physical downlink shared channel communication of the one or more NTN SIBS or a last slot number of a first transmission window in an update period, and a system scheduling offset value.

Aspect 43: An apparatus for wireless communication comprising a memory comprising instructions and one or more processors configured to execute the instructions and cause the apparatus to perform the method of one or more of Aspects 1-21.

Aspect 44: A user equipment (UE), comprising at least one receiver, a memory comprising instructions, and one or more processors configured to execute the instructions and cause the UE to perform the method of one or more of Aspects 1-21, wherein the at least one receiver is configured to receive the SIB and the one or more NTN SIBs.

Aspect 45: An apparatus for wireless communication, comprising at least one means for performing the method of one or more of Aspects 1-21.

Aspect 46: A non-transitory computer-readable medium comprising one or more instructions that, when executed by one or more processors of an apparatus, cause the apparatus to perform the method of one or more of Aspects 1-21.

Aspect 47: An apparatus for wireless communication comprising a memory comprising instructions and one or more processors configured to execute the instructions and cause the apparatus to perform the method of one or more of Aspects 22-42.

Aspect 48: An entity of a non-terrestrial network (NTN), comprising at least one transmitter, a memory comprising instructions, and one or more processors configured to execute the instructions and cause the entity of the NTN to perform the method of one or more of Aspects 22-42, wherein the at least one transmitter is configured to transmit the SIB and the one or more NTN SIBS.

Aspect 49: An apparatus for wireless communication, comprising at least one means for performing the method of one or more of Aspects 22-42.

Aspect 50: A non-transitory computer-readable medium comprising one or more instructions that, when executed by one or more processors of an apparatus, cause the apparatus to perform the method of one or more of Aspects 22-42.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication, comprising:
one or more memories comprising instructions; and
one or more processors configured to execute the instructions and cause the apparatus to:
 obtain a system information block (SIB) that indicates information relating to one or more non-terrestrial network (NTN) SIBs;
 obtain the one or more NTN SIBs based at least in part on the information, said one or more NTN SIBs including at least one of ephemeris information or feeder link timing advance information; and
 communicate with one or more entities of an NTN based at least in part on the one or more NTN SIBs, wherein at least one of:
  a reference time for the at least one of the ephemeris information or the feeder link timing advance information is based at least in part on a particular downlink transmit timepoint,
  an update to the at least one of the ephemeris information or the feeder link timing advance information is independent of triggering a system information update procedure, or
  the one or more NTN SIBs include a single NTN SIB that includes the ephemeris information and the feeder link timing advance information.

2. The apparatus of claim 1, wherein the reference time for the ephemeris information is based at least in part on the particular downlink transmit timepoint.

3. The apparatus of claim 1, wherein the reference time for the feeder link timing advance information is based at least in part on the particular downlink transmit timepoint.

4. The apparatus of claim 1, wherein the update to the at least one of the ephemeris information or the feeder link timing advance information is independent of triggering the system information update procedure.

5. The apparatus of claim 1, wherein the one or more NTN SIBs include a single NTN SIB that includes the ephemeris information and the feeder link timing advance information.

6. The apparatus of claim 1, wherein the information indicates at least one of a resource allocation for obtaining the one or more NTN SIBs, a modulation and coding scheme for obtaining the one or more NTN SIBs, a message size of the one or more NTN SIBs, a validity duration of the one or more NTN SIBs, or an accuracy of the one or more NTN SIBs.

7. The apparatus of claim 1, wherein the feeder link timing advance information indicates a feeder link timing advance with timing drift.

8. The apparatus of claim 1, wherein the feeder link timing advance information indicates a feeder link timing advance without timing drift.

9. The apparatus of claim 1, wherein the information indicates the feeder link timing advance information and the feeder link timing advance information indicates the feeder link timing advance without timing drift.

10. The apparatus of claim 1, further comprising:
a receiver configured to receive the SIB and the one or more NTN SIBs, wherein the apparatus is configured as a user equipment (UE).

11. One or more apparatuses for wireless communication, comprising:
one or more memories comprising instructions; and
one or more processors configured to execute the instructions and cause the one or more apparatuses to:
 output for transmission to a user equipment (UE) a system information block (SIB) that indicates information relating to one or more non-terrestrial network (NTN) SIBs;
 output for transmission to the UE the one or more NTN SIBs based at least in part on the information, said one or more NTN SIBs including at least one of ephemeris information or feeder link timing advance information; and
 communicate with the UE based at least in part on the one or more NTN SIBs, wherein at least one of:
  a reference time for the at least one of the ephemeris information or the feeder link timing advance information is based at least in part on a particular downlink transmit timepoint,
  an update to the at least one of the ephemeris information or the feeder link timing advance information is independent of triggering a system information update procedure, or
  the one or more NTN SIBs include a single NTN SIB that includes the ephemeris information and the feeder link timing advance information.

12. The one or more apparatuses of claim 11, wherein the reference time for the ephemeris information is based at least in part on the particular downlink transmit timepoint.

13. The one or more apparatuses of claim 11, wherein the reference time for the feeder link timing advance information is based at least in part on the particular downlink transmit timepoint.

14. The one or more apparatuses of claim 11, wherein the update to the at least one of the ephemeris information or the feeder link timing advance information is independent of triggering the system information update procedure.

15. The one or more apparatuses of claim 11, wherein the one or more NTN SIBs include a single NTN SIB that includes the ephemeris information and the feeder link timing advance information.

16. The one or more apparatuses of claim 11, wherein the information indicates at least one of a resource allocation for obtaining the one or more NTN SIBs, a modulation and coding scheme for obtaining the one or more NTN SIBs, a message size of the one or more NTN SIBs, a validity duration of the one or more NTN SIBs, or an accuracy of the one or more NTN SIBs.

17. The one or more apparatuses of claim 11, wherein the feeder link timing advance information indicates a feeder link timing advance with timing drift or a feeder link timing advance without timing drift.

18. The one or more apparatuses of claim 11, wherein the information indicates the feeder link timing advance information and the feeder link timing advance information indicates the feeder link timing advance without timing drift.

19. The one or more apparatuses of claim 11, further comprises:
one or more transmitters configured to transmit the SIB and the one or more NTN SIBs, wherein the one or more apparatuses are configured as one or more entities of the NTN.

20. An apparatus for wireless communication, comprising:
one or more memories comprising instructions; and
one or more processors configured to execute the instructions and cause the apparatus to:
obtain a system information block (SIB) that indicates information relating to one or more non-terrestrial network (NTN) SIBs;
obtain the one or more NTN SIBs based at least in part on the information, said one or more NTN SIBs including at least one of ephemeris information or feeder link timing advance information; and
communicate with one or more entities of an NTN based at least in part on the one or more NTN SIBs, wherein:
an update to the at least one of the ephemeris information or the feeder link timing advance information is independent of triggering a system information update procedure.

21. An apparatus for wireless communication, comprising:
one or more memories comprising instructions; and
one or more processors configured to execute the instructions and cause the apparatus to:
obtain a system information block (SIB) that indicates information relating to one or more non-terrestrial network (NTN) SIBs;
obtain the one or more NTN SIBs based at least in part on the information, said one or more NTN SIBs including at least one of ephemeris information or feeder link timing advance information; and
communicate with one or more entities of an NTN based at least in part on the one or more NTN SIBs, wherein:
the one or more NTN SIBs include a single NTN SIB that includes the ephemeris information and the feeder link timing advance information.

22. One or more apparatuses for wireless communication, comprising:
one or more memories comprising instructions; and
one or more processors configured to execute the instructions and cause the one or more apparatuses to:
output for transmission to a user equipment (UE) a system information block (SIB) that indicates information relating to one or more non-terrestrial network (NTN) SIBs;
output for transmission to the UE the one or more NTN SIBs based at least in part on the information, said one or more NTN SIBs including at least one of ephemeris information or feeder link timing advance information; and
communicate with the UE based at least in part on the one or more NTN SIBs, wherein:
an update to the at least one of the ephemeris information or the feeder link timing advance information is independent of triggering a system information update procedure.

23. One or more apparatuses for wireless communication, comprising:
one or more memories comprising instructions; and
one or more processors configured to execute the instructions and cause the one or more apparatuses to:
output for transmission to a user equipment (UE) a system information block (SIB) that indicates information relating to one or more non-terrestrial network (NTN) SIBs;
output for transmission to the UE the one or more NTN SIBs based at least in part on the information, said one or more NTN SIBs including at least one of ephemeris information or feeder link timing advance information; and
communicate with the UE based at least in part on the one or more NTN SIBs, wherein:
the one or more NTN SIBs include a single NTN SIB that includes the ephemeris information and the feeder link timing advance information.

\* \* \* \* \*